United States Patent
You et al.

(10) Patent No.: US 9,668,152 B2
(45) Date of Patent: May 30, 2017

(54) METHOD FOR PERFORMING MEASUREMENT AND TERMINAL

(71) Applicant: LG ELECTRONICS INC., Seoul (KR)

(72) Inventors: Hyangsun You, Seoul (KR); Yunjung Yi, Seoul (KR); Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 14/694,536

(22) Filed: Apr. 23, 2015

(65) Prior Publication Data

US 2015/0312789 A1  Oct. 29, 2015

Related U.S. Application Data

(60) Provisional application No. 61/984,017, filed on Apr. 24, 2014, provisional application No. 61/989,518, (Continued)

(51) Int. Cl.
*H04W 24/08* (2009.01)
*H04W 48/16* (2009.01)
(Continued)

(52) U.S. Cl.
CPC ........... *H04W 24/08* (2013.01); *H04L 1/0693* (2013.01); *H04L 5/0007* (2013.01);
(Continued)

(58) Field of Classification Search
CPC . H04W 24/08; H04W 24/10; H04W 36/0088; H04W 48/16; H04W 84/045; H04L 1/0693; H04L 5/0007; H04L 47/822
See application file for complete search history.

(56) References Cited

U.S. PATENT DOCUMENTS 8,526,419 B2   9/2013 Tenny
2012/0113843 A1   5/2012 Watfa et al.
(Continued)

FOREIGN PATENT DOCUMENTS

WO   WO 2011/130452 A2   10/2011
WO   WO 2012/084596 A1   6/2012
WO   WO 2013/151404 A1   10/2013

OTHER PUBLICATIONS

Huawei et al., "Enhancements of RRM measurements for small cell on/off," 3GPP TSG RAN WG1 Meeting #76, R1-140038, Prague, Czech Republic, Feb. 10-14, 2014, pp. 1-4.
(Continued)

*Primary Examiner* — Paul H Masur
(74) *Attorney, Agent, or Firm* — Birch, Stewart, Kolasch & Birch, LLP

(57) ABSTRACT

There is a method for performing measurements. The method may be performed by a user equipment (UE) and comprise: receiving a measurement subframe pattern for a neighbor cell and a measurement timing configuration for a discovery signal; selecting at least one or more subframes to perform the measurement based on both of the measurement subframe pattern and the measurement timing configuration; and performing the measurement by using the discovery signal of the neighbor cell on the selected subframes.

14 Claims, 21 Drawing Sheets

Related U.S. Application Data filed on May 6, 2014, provisional application No. 61/993,286, filed on May 15, 2014, provisional application No. 62/009,866, filed on Jun. 9, 2014, provisional application No. 62/034,797, filed on Aug. 8, 2014.

(51) Int. Cl.
  *H04L 1/06* (2006.01)
  *H04L 5/00* (2006.01)
  *H04L 12/911* (2013.01)
  *H04W 24/10* (2009.01)
  *H04W 36/00* (2009.01)
  *H04W 84/04* (2009.01)

(52) U.S. Cl.
  CPC ........... *H04L 47/822* (2013.01); *H04W 24/10* (2013.01); *H04W 48/16* (2013.01); *H04W 36/0088* (2013.01); *H04W 84/045* (2013.01)

(56) References Cited

U.S. PATENT DOCUMENTS

| | | | |
|---|---|---|---|
| 2015/0029919 A1 | 1/2015 | Han et al. | |
| 2015/0195770 A1 | 7/2015 | Sun et al. | |
| 2015/0264592 A1 | 9/2015 | Novlan et al. | |
| 2015/0282131 A1* | 10/2015 | Nagata | H04W 16/32 370/329 |
| 2015/0358899 A1* | 12/2015 | Ko | H04W 48/16 370/252 |
| 2016/0057603 A1* | 2/2016 | Tiirola | H04W 8/005 370/329 |
| 2016/0119093 A1* | 4/2016 | Xu | H04W 48/12 455/434 |
| 2016/0212647 A1* | 7/2016 | Mo | H04W 48/12 |
| 2016/0219453 A1* | 7/2016 | Harada | H04W 52/346 |
| 2016/0219475 A1* | 7/2016 | Kim | H04W 76/025 |
| 2016/0234762 A1* | 8/2016 | You | H04J 11/0056 |
| 2016/0234845 A1* | 8/2016 | Zhang | H04W 72/0453 |
| 2016/0242061 A1* | 8/2016 | Harada | H04L 5/0098 |
| 2016/0242083 A1* | 8/2016 | Guan | H04W 24/08 |
| 2016/0242123 A1 | 8/2016 | Harada et al. | |

OTHER PUBLICATIONS

Huawei et al., "Mechanisms for energy-efficient small cell discovery and measurements," 3GPP TSG RAN WG1 Meeting #76bis, R1-141589, Shenzhen, China, Mar. 31-Apr. 4, 2014, pp. 1-4.

NTT Docomo, Views on Discovery Signal-based RSRQ Measurement, 3GPP TSG RAN WG1 Meeting #76bis, R1-141467, Shenzhen, China, Mar. 31-Apr. 4, 2014, pp. 1-4.

3GPP, "3rd Generation Partnership Project; Technical Specification Group Radio Access Network; Evolved Universal Terrestrial Radio Access (E-UTRA); Requirements for Support of Radio Resource Management (Release 12)," 3GPP TS 36.133 V12.3.0, Mar. 2014, pp. 26-163.

Huawei et al., "UE Monitoring Behavior with DRS Configurations," 3GPP TSG RAN WG1 Meeting #76bis, R1-141123, Shenzhen, China, Mar. 31-Apr. 4, 2014, 7 pages.

LG Electronics et al., "WF on DRS Measurement Configuration," 3GPP TSG RAN WG1 #76bis, R1-141865, Shenzhen, China, Mar. 31-Apr. 4, 2014, 3 pages.

LG Electronics et al., "WF on Measurement Assumptions with Network Assistance," 3GPP TSG RAN WG1 #76bis, R1-141852, Shenzhen, China, Mar. 31-Apr. 4, 2014, 3 pages.

LG Electronics, "Discovery Signal Design Choices and Considerations," 3GPP TSG RAN WG1 Meeting #76bis, R1-141340, Shenzhen, China, Mar. 31-Apr. 4, 2014, 8 pages.

\* cited by examiner

FIG. 11
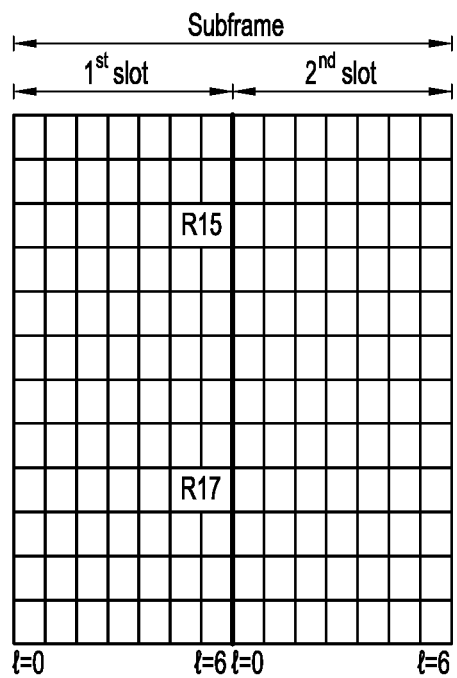
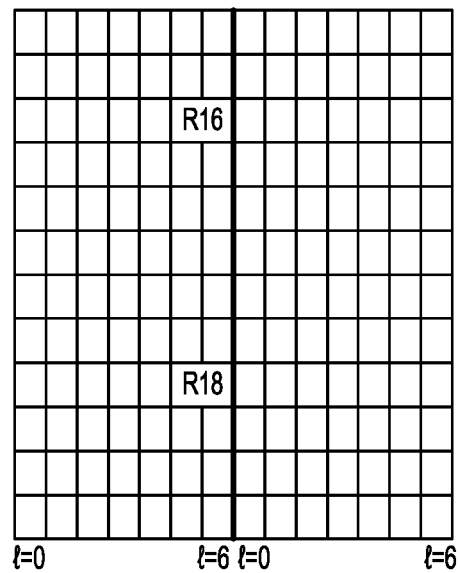
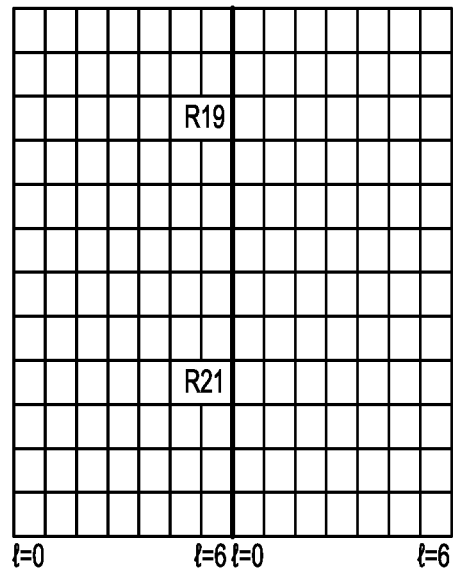
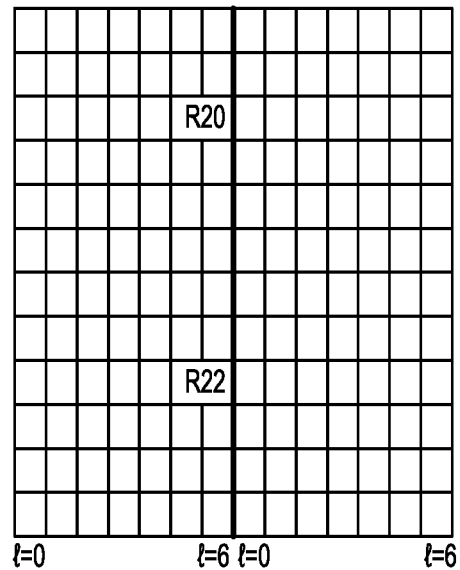

Measurement subframes

METHOD FOR PERFORMING MEASUREMENT AND TERMINAL

CROSS REFERENCE TO RELATED APPLICATIONS

This non-provisional application claims the benefit under 35 U.S.C. §119(e) to U.S. Provisional Application Nos. 61/984,017, filed on Apr. 24, 2014, 61/989,518 filed on May 6, 2014, 61/993,286 filed on May 15, 2014, 62/009,866 filed on Jun. 9, 2014, 62/034,797 filed on Aug. 8, 2014, all of which are hereby expressly incorporated by reference into the present application.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. To understand OFDMA, OFDM should be known. OFDM may attenuate inter-symbol interference with low complexity and is in use. OFDM converts data serially input into N parallel data pieces and carries the data pieces over N orthogonal sub-carriers. The sub-carriers maintain orthogonality in view of frequency. Meanwhile, OFDMA refers to a multiple access scheme that realizes multiple access by independently providing each user with some of sub-carriers available in the system that adopts OFDM as its modulation scheme.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

In a next-generation mobile communication system, it is expected that a small cell having a small cell coverage radius will be added to the coverage of an existing cell and a small cell will process more traffic.

However, if small cells within the coverage of a macro cell are densely deployed, it may be difficult for UE to detect the small cells within a short time.

SUMMARY OF THE INVENTION

Accordingly, the disclosure of this specification is to solve the aforementioned problem.

In order to achieve the object, the disclosure of this specification is to provide a method for performing measurements. The method may be performed by a user equipment (UE) and comprise: receiving a measurement subframe pattern for a neighbor cell and a measurement timing configuration for a discovery signal; selecting at least one or more subframes to perform the measurement based on both of the measurement subframe pattern and the measurement timing configuration; and performing the measurement by using the discovery signal of the neighbor cell on the selected subframes.

The subframes on which the measurement may be performed correspond to at least one or more overlapped subframes between the measurement subframe pattern and the measurement timing configuration.

The selecting step may include: selecting specific subframes based on the measurement subframe pattern; and selecting the at least one or more subframes among the specific subframes based on the measurement timing configuration.

The measurement timing configuration may be configured per carrier frequency.

The method may further comprise: if the neighbor cell is in the deactivated state, using the discovery signal rather than a cell-specific reference signal (CRS) to perform the measurements.

The discovery signal may be a signal based on at least one of cell-specific reference signal (CRS), a channel-state information reference signal (CSI-RS), a primary synchronization signal (PSS) and a secondary synchronization signal (SSS).

If the measurement is for measuring a received signal strength indicator (RSSI), the measurement may be performed on entire OFDM symbols of a subframe.

In order to achieve the object, the disclosure of this specification is to provide a user equipment (UE) for performing measurements. The UE may comprise: a radio frequency (RF) unit configured to receive a measurement subframe pattern for a neighbor cell and a measurement timing configuration for a discovery signal; and a processor configured to select at least one or more subframes to perform the measurement based on both of the measurement subframe pattern and the measurement timing configuration and perform the measurement by using the discovery signal of the neighbor cell on the selected subframes.

In accordance with the disclosure of this specification, the aforementioned conventional problem is solved.

BRIEF DESCRIPTION OF THE DRAWINGS

FIG. 11 illustrates an example of RBs to which CSI-RSs are mapped in reference signals.

DESCRIPTION OF EXEMPLARY EMBODIMENTS

Figure 1:
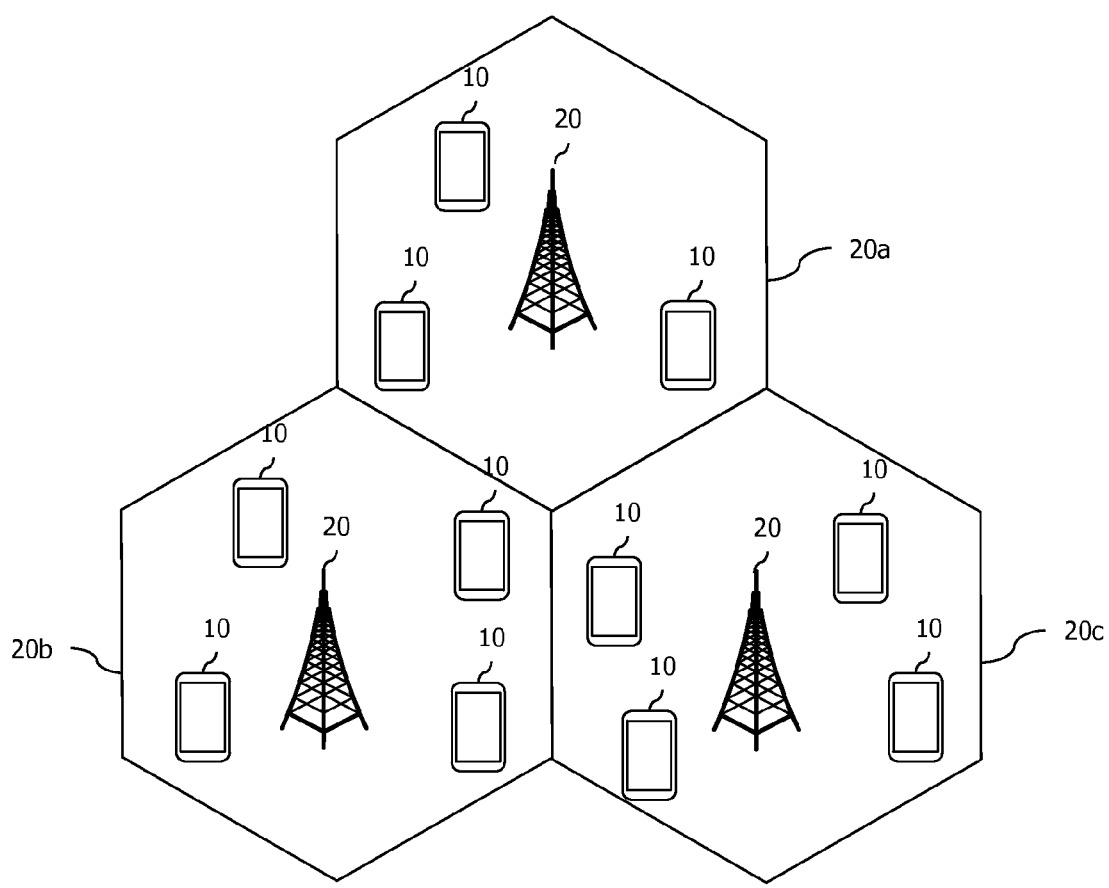
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

Furthermore, UE (user equipment) used herein may be fixed or may have mobility and may be called another term, such as a device, a wireless device, a terminal, an MS (mobile station), a UT (user terminal), an SS (subscriber station), or an MT (mobile terminal).

As used herein, 'user equipment (UE)' may be stationary or mobile, and may be denoted by other terms such as device, wireless device, terminal, MS (mobile station), UT (user terminal), SS (subscriber station), MT (mobile terminal) or other name.

FIG. 1 shows a wireless communication system.

The wireless communication system includes at least one base station (BS) 20. Respective BSs 20 provide a communication service to particular geographical areas 20a, 20b, and 20c (which are generally called cells). Each cell may be divided into a plurality of areas (which are called sectors).

The UE generally belongs to one cell and the cell to which the UE belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
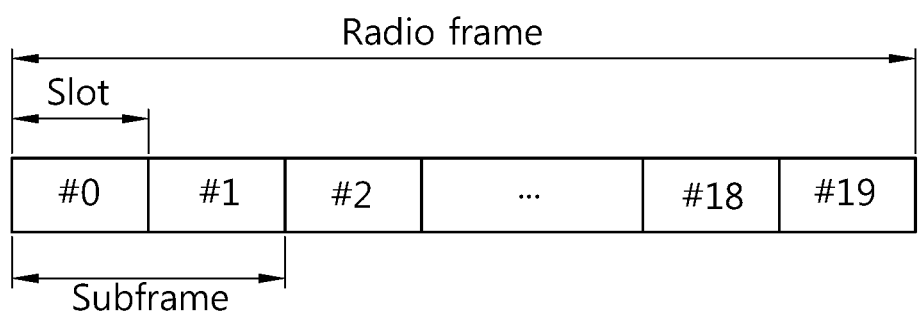
FIG. 2 illustrates the structure of a radio frame according to FDD in 3GPP LTE.

FIG. 2 shows a downlink radio frame structure according to FDD of 3rd generation partnership project (3GPP) long term evolution (LTE).

For the radio frame shown in FIG. 2, 3GPP (3rd Generation Partnership Project) TS 36.211 V10.4.0 (2011-12) "Technical Specification Group Radio Access Network; Evolved Universal Terrestrial Radio Access (E-UTRA); Physical channels and modulation (Release 8)", Ch. 5 may be referenced.

Referring to FIG. 2, a radio frame includes 10 sub-frames, and one sub-frame includes two slots. The slots in the radio frame are marked with slot numbers 0 through 19. The time taken for one sub-frame to be transmitted is referred to as a TTI (transmission time duration). The TTI may be the unit of scheduling for data transmission. For example, the length of one radio frame may be 10 ms, the length of one sub-frame may be 1 ms, and the length of one slot may be 0.5 ms.

The structure of a radio frame is merely an example, and the number of sub-frames included in the radio frame or the number of slots included in a sub-frame may vary differently.

Meanwhile, one slot may include a plurality of OFDM symbols. The number of OFDM symbols included in one slot may vary depending on a cyclic prefix (CP). In particular, in 3GPP LTE, it is defined such that 7 OFDM symbols are included in one slot in a normal CP case, and 6 OFDM symbols are included in one slot in an extended CP case. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Figure 3:
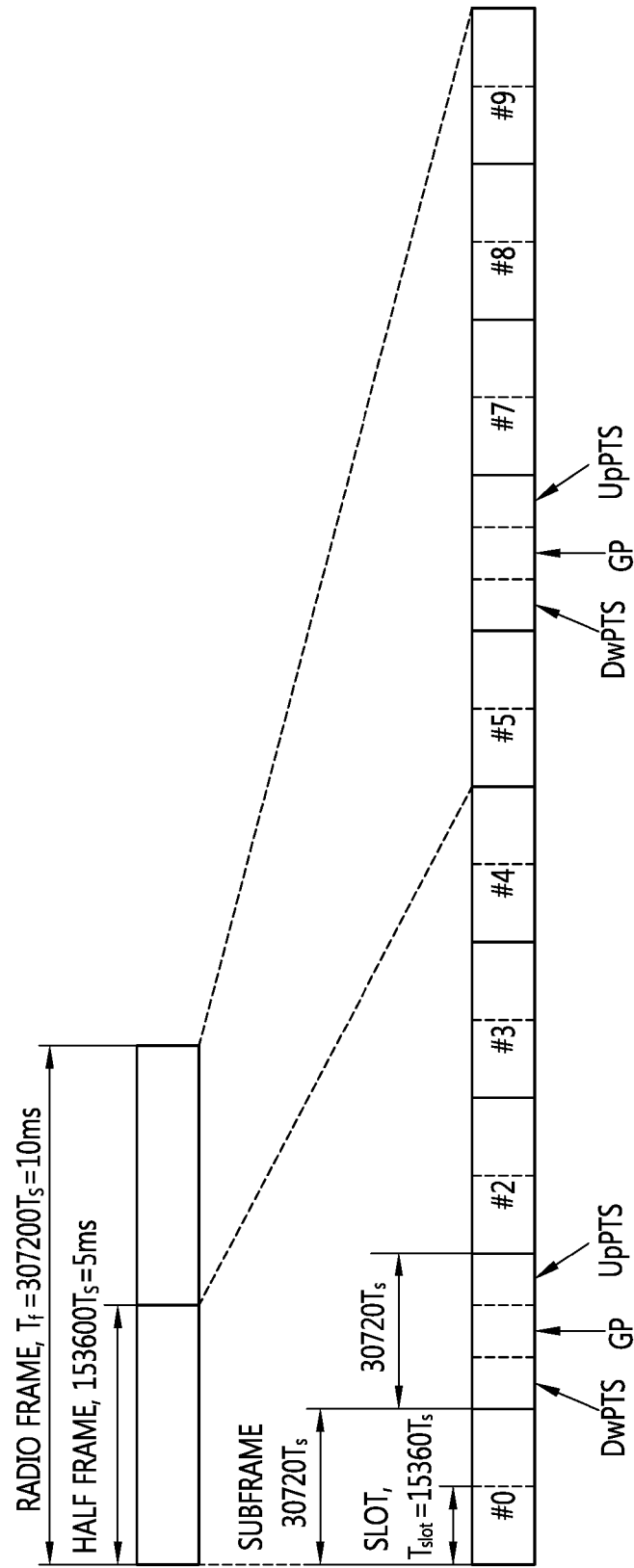
FIG. 3 illustrates the structure of a downlink radio frame according to TDD in 3GPP LTE.

FIG. 3 illustrates the architecture of a downlink radio frame according to TDD in 3GPP LTE.

3GPP (3rd Generation Partnership Project) TS 36.211 V10.4.0 (2011-12) "Technical Specification Group Radio Access Network; Evolved Universal Terrestrial Radio Access (E-UTRA); Physical channels and modulation (Release 10)", Ch. 4 may be referenced.

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| | Normal CP in downlink | | | Extended CP in downlink | | |
|---|---|---|---|---|---|---|
| | | UpPTS | | | UpPTS | |
| Special subframe configuration | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*ts |
| 5 | 6592*Ts | 4384*Ts | 5120*ts | 20480*Ts | | |
| 6 | 19760*Ts | | | 23040*Ts | | |
| 7 | 21952*Ts | | | — | | |
| 8 | 24144*Ts | | | — | | |

Figure 4:
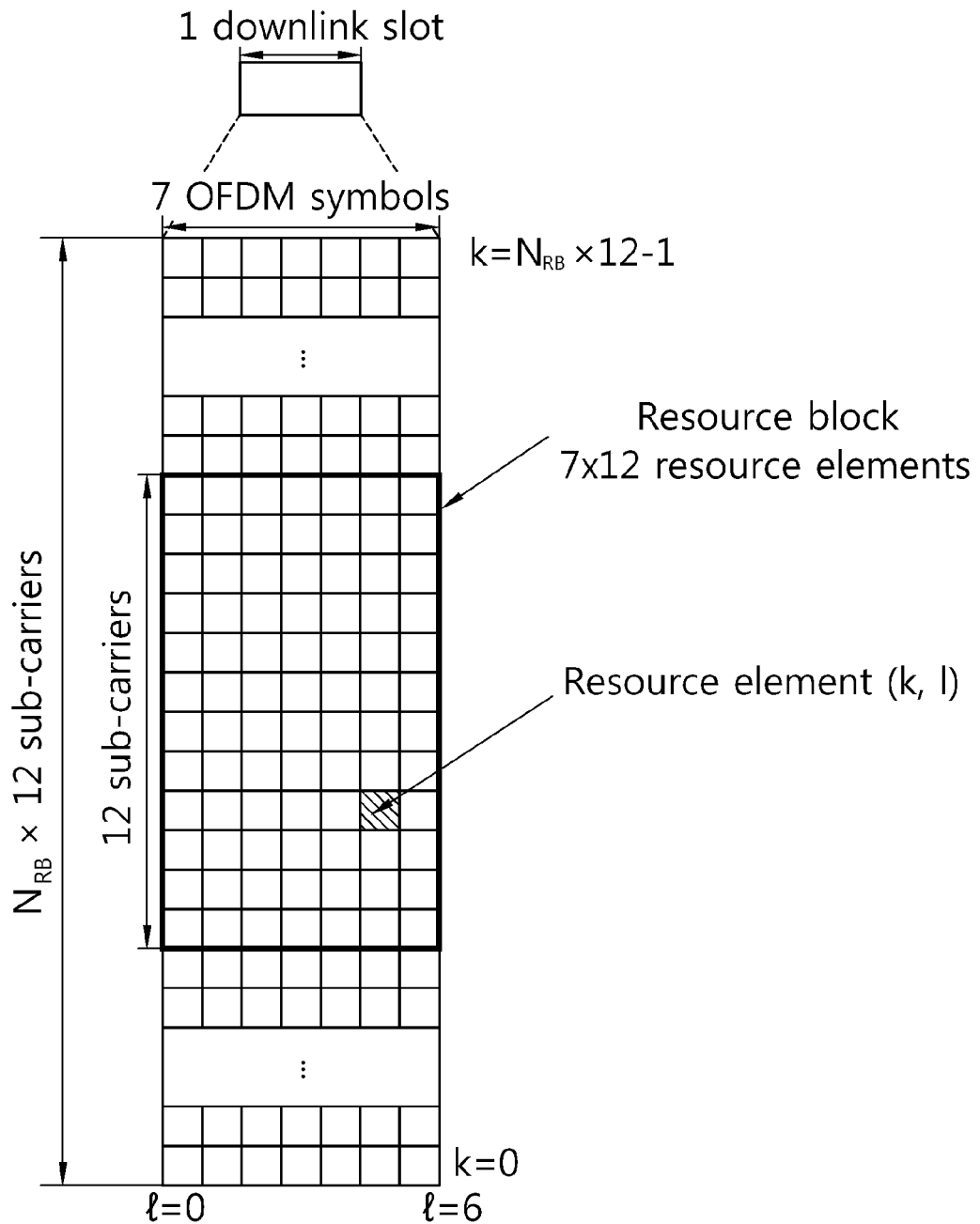
FIG. 4 is an examplary diagram illustrating a resource grid for a single uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
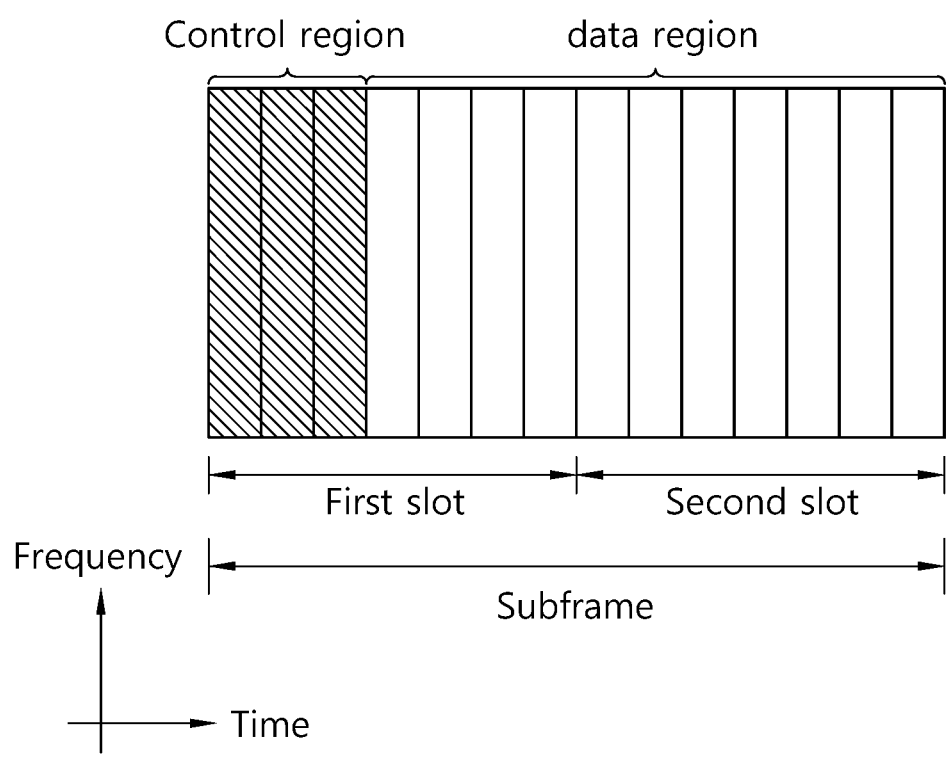
FIG. 5 illustrates the structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

When UE monitors a PDCCH based on a C-RNTI, a DCI format and a search space to be monitored are determined depending on transmission mode of a PDSCH. The following table shows an example of the monitoring of a PDCCH in which a C-RNTI is set.

TABLE 3

| TRANSMISSION MODE | DCI FORMAT | SEARCH SPACE | TRANSMISSION MODE OF PDSCH ACCORDING TO PDCCH |
|---|---|---|---|
| Mode 1 | DCI format 1A | common and UE-specific | Single antenna port, port 0 |
| | DCI format 1 | UE-specific | Single antenna port, port 0 |
| Mode 2 | DCI format 1A | common and UE-specific | Transmit diversity |
| | DCI format 1 | UE-specific | Transmit diversity |
| Mode 3 | DCI format 1A | common and UE-specific | Transmit diversity |
| | DCI format 2A | UE-specific | Cyclic Delay Diversity (CDD) or transmit diversity |
| Mode 4 | DCI format 1A | common and UE-specific | Transmit diversity |
| | DCI format 2 | UE-specific | Closed-loop spatial multiplexing |
| Mode 5 | DCI format 1A | common and UE-specific | Transmit diversity |
| | DCI format 1D | UE-specific | Multi-user Multiple Input Multiple Output (MU-MIMO) |
| Mode 6 | DCI format 1A | common and UE-specific | Transmit diversity |
| | DCI format 1B | UE-specific | Closed-loop spatial multiplexing |
| Mode 7 | DCI format 1A | common and UE-specific | If the number of PBCH transmission ports is 1, single antenna port, port 0, and if not, transmit diversity |
| | DCI format 1 | UE-specific | a single antenna port, port 5 |
| Mode 8 | DCI format 1A | common and UE-specific | If the number of PBCH transmission ports is 1, single antenna port, port 0, and if not, transmit diversity |
| | DCI format 2B | UE-specific | Dual layer transmission (port 7 or 8), or a single antenna port, port 7 or 8 |
| Mode 9 | DCI format 1A | common and UE-specific | Non-MBSFN subframe: If the number of PBCH antenna ports is one, Single-antenna port, port 0 is used, otherwise Transmit diversity. MBSFN subframe: Single-antenna port, port 7 |
| | DCI format 2C | UE-specific | Up to 8 layer transmission, ports 7-14 |

Purposes of DCI formats are classified as follows.

TABLE 4

| DCI format | Contents |
|---|---|
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |
| DCI format 4 | It is used for PUSCH scheduling in one UL cell in a multi-antenna Tx mode. |

Figure 6:
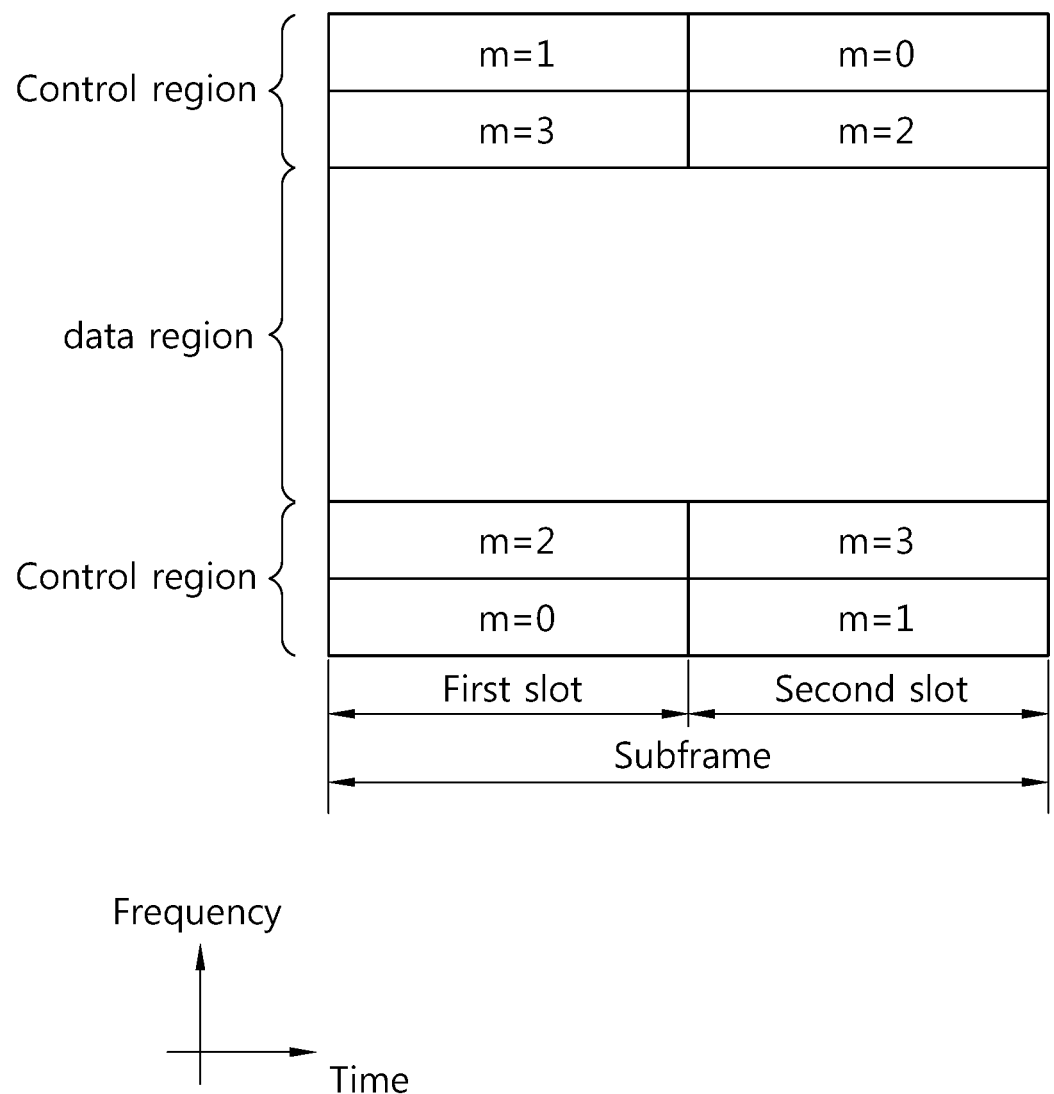
FIG. 6 illustrates the structure of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

A resource block pair (RB pair) is allocated to a PUCCH for one UE in a subframe. Resource blocks belonging to a resource block pair occupy different subcarriers in a first slot and a second slot. A frequency occupied by resource blocks belonging to a resource block pair allocated to a PUCCH is changed based on a slot boundary. This is said that the RB pair allocated to the PUCCH has been frequency-hopped in the slot boundary.

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel state information (CSI) indicating a DL channel state, scheduling request (SR) which is a UL radio resource allocation request, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH. Examples of the control information to be multiplexed with data may include a channel quality indicator (CQI), a precoding matrix indicator (PMI), HARQ, a rank indicator (RI), etc. Alternatively, the uplink data may consist of only the control information.

<Carrier Aggregation (CA)>

A carrier aggregation system is described below.

A carrier aggregation system means that a plurality of component carriers (CC) is aggregated. The meaning of an existing cell has been changed by such a carrier aggregation. In accordance with the carrier aggregation, a cell may mean a combination of downlink CCs and uplink CCs or a single downlink CC.

Furthermore, in the carrier aggregation, cells may be divided into a primary cell, a secondary cell, and a serving cell. The primary cell means a cell operating in a primary frequency, a cell in which UE performs an initial connection establishment procedure or connection reestablishment process on an eNodeB, or a cell designated as a primary cell in a handover process. The secondary cell means a cell operating in a secondary frequency. If an RRC connection is set up, the secondary cell is configured and used to provide additional radio resources.

As described above, in a carrier aggregation system, a plurality of component carrier (CC), that is, a plurality of serving cells, can be supported unlike in a single carrier system.

Such a carrier aggregation system can support cross-carrier scheduling. Cross-carrier scheduling is a scheduling method for allocating the resource of a PDSCH transmitted through another component carrier and/or allocating the resource of a PUSCH transmitted through a component carrier other than a component carrier basically linked to a specific component carrier, through a PDCCH transmitted through the specific component carrier.

<Synchronization Signal>

In LTE/LTE-A systems, synchronization with a cell is obtained through a synchronization signal (SS) in a cell search process.

The synchronization signal is described in detail below with reference to FIG. 7.

Figure 7:
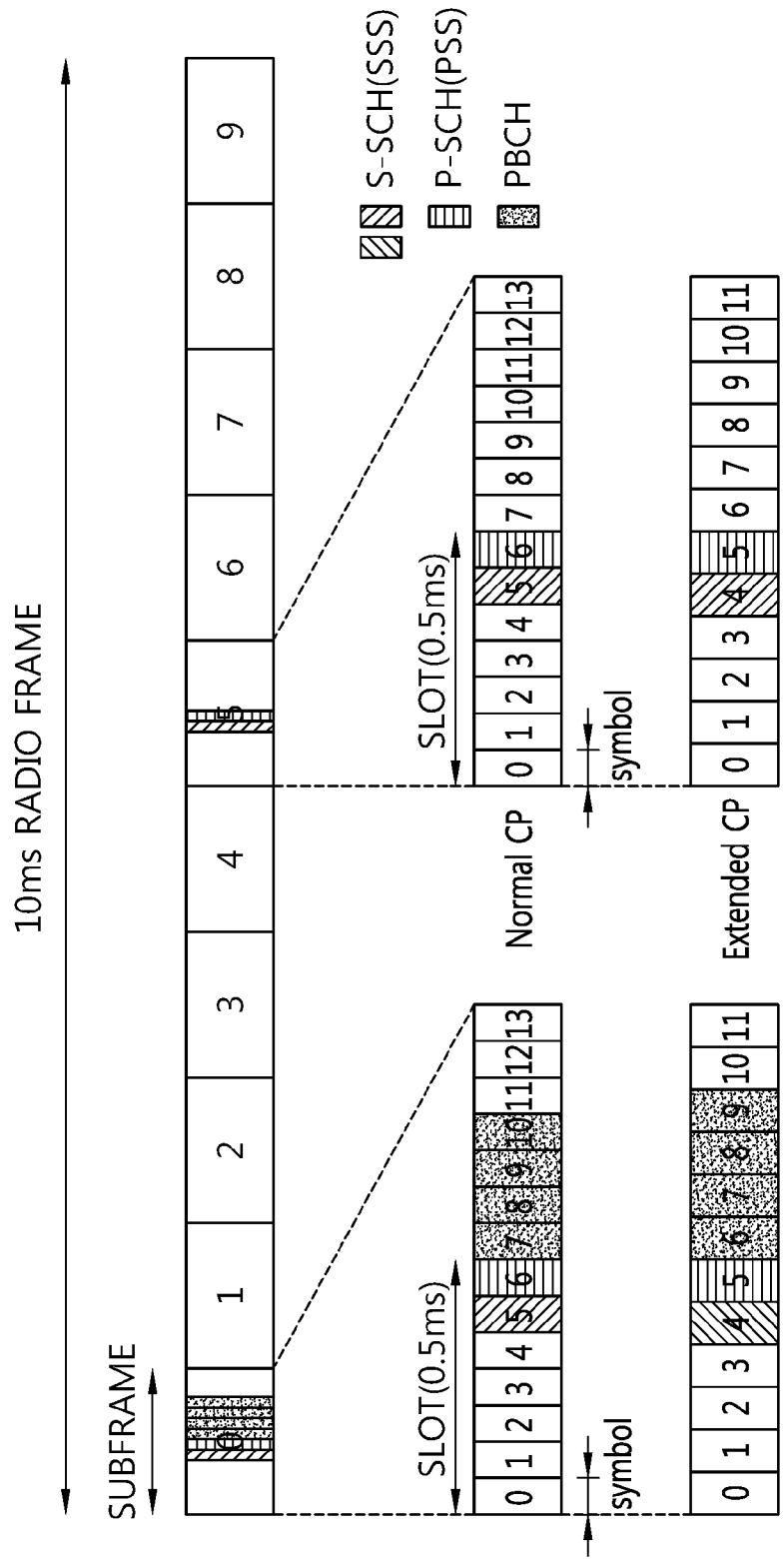
FIG. 7 illustrates a frame structure for the transmission of a synchronization signal in an FDD frame.

FIG. 7 illustrates a frame structure for the transmission of a synchronization signal in an FDD frame.

A slot number and a subframe number starts with 0. UE may perform time and frequency synchronization based on a synchronization signal received from an eNodeB. In 3GPP LTE-A, a synchronization signal is used for cell search and may be divided into a primary synchronization signal (PSS) and a secondary synchronization signal (SSS). In 3GPP LTE-A, for a synchronization signal, reference may be made to Paragraph 6.11 of 3GPP TS V10.2.0 (2011-06).

A PSS is used to obtain OFDM symbol synchronization or slot synchronization and associated with a physical-layer cell identity (PCI). Furthermore, an SSS is used to obtain frame synchronization. Furthermore, an SSS is used to detect a CP length and to obtain a physical layer cell group ID.

A synchronization signal may be transmitted in a subframe No. 0 and a subframe No. 5 several time by taking into consideration 4.6 ms, that is, the length of a GSM (global system for mobile communication) frame in order to facilitate inter-RAT (radio access technology) measurement. The boundary of the frame may be detected through an SSS. More specifically, in an FDD system, a PSS is transmitted in the last OFDM symbol of a slot No. 1 or a slot No. 10, and an SSS is transmitted in an OFDM symbol right before a PSS.

A synchronization signal may send any one of a total of 504 physical cell IDs through a combination of three PSSs and 168 SSSs. A PBCH (physical broadcast channel) is transmitted in the first 4 OFDM symbols of the first slot. A synchronization signal and PBCH are transmitted within center 6 Rbs within a system bandwidth so that UE can detect or demodulate the synchronization signal regardless of a transmission bandwidth. A physical channel in which a PSS is transmitted is called a P-SCH, and a physical channel in which an SSS is transmitted is called an S-SCH.

Figure 8:
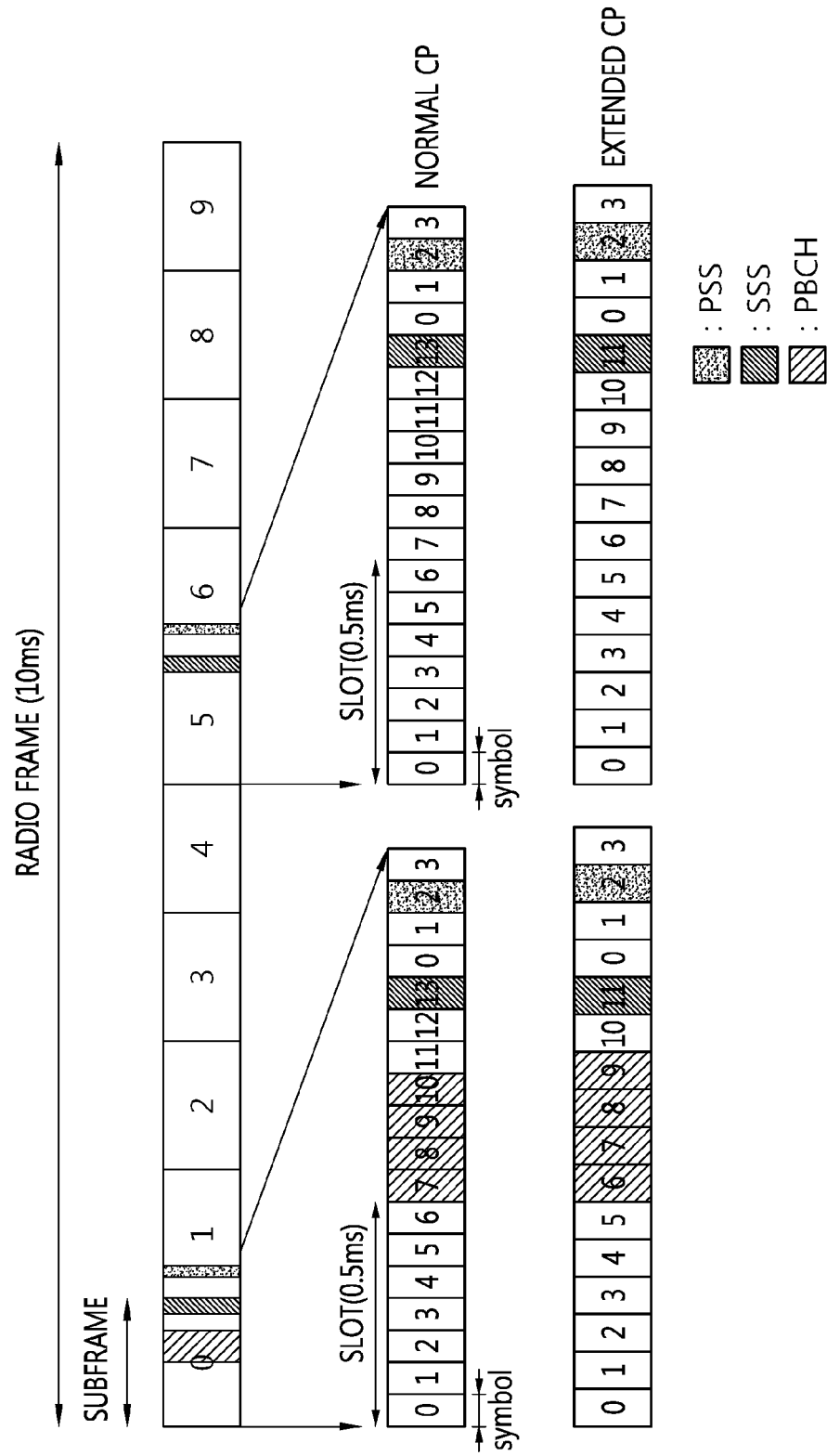
FIG. 8 illustrates an example of a frame structure for sending a synchronization signal in a TDD frame.

FIG. 8 illustrates an example of a frame structure for sending a synchronization signal in a TDD frame.

In a TDD frame, a PSS is transmitted in the third OFDM symbols of a third slot and thirteenth slot. An SSS is transmitted prior to three OFDM symbols in OFDM symbols in which a PSS is transmitted. A PBCH is transmitted in the first 4 OFDM symbols of a second slot in the first subframe.

<Reference Signal>

A RS is described below.

In general, transmission information, for example, data is easily distored and changed while it is transmitted through a radio channel. Accordingly, a reference signal is required in order to demodulate such a transmission information without an error. The reference signal is a signal known to both a transmitter and a receiver and is transmitted along with transmission information. Since transmission information transmitted by a transmitter experiences a corresponding channel for each transmission antenna or layer, a reference signal may be allocated to each transmission antenna or layer. A reference signal for each transmission antenna or layer layer may be identified using resources, such as a frequency and code. A reference signal may be used for two purposes, that is, the demodulation and channel estimation of transmission information.

A downlink reference signal may be divided into a cell-specific reference signal (CRS), an MBSFN (multimedia broadcast and multicast single frequency network) reference signal, a UE-specific reference signal (UE-specific RS, URS), a positioning reference signal (positioning RS, PRS), and a CSI reference signal (CSI-RS). The CRS is a reference signal transmitted to all UEs within a cell and also called a common reference signal. The CRS may be used for the channel measurement of CQI feedback and the channel estimation of PDSCH. The MBSFN reference signal may be transmitted in a subframe allocated for MBSFN transmission. The URS is a reference signal received by a specific UE or specific UE group within a cell and may be called a demodulation reference signal (DM-RS). The DM-RS is chiefly used for a specific UE or specific UE group to perform data demodulation. The PRS may be used to estimate the location of UE. The CSI-RS is used for the channel estimation of the PDSCH of LTE-A UE. The CSI-RSs are deployed relatively sparsely in a frequency domain or time domain and may be punctured in the data region of a common subframe or MBSFN subframe.

Figure 9:
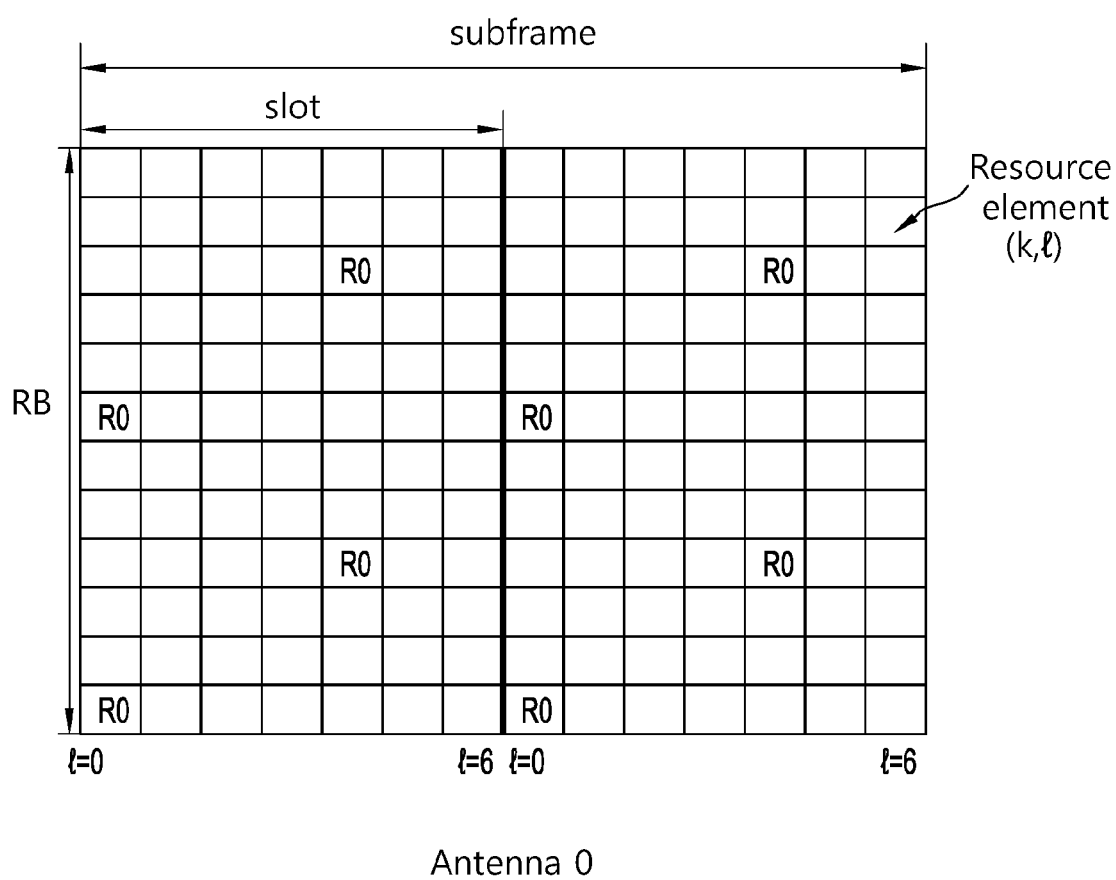
FIG. 9 illustrates an example of a pattern in which CRSs are mapped to RBs if an eNodeB uses a single antenna port.

FIG. 9 illustrates an example of a pattern in which CRSs are mapped to RBs if an eNodeB uses a single antenna port.

Referring to FIG. 9, R0 illustrates an RE to which a CRS transmitted by the antenna port number 0 of an eNodeB is mapped.

The CRS is transmitted in all downlink subframes within a cell that supports PDSCH transmission. The CRS may be transmitted on antenna ports 0 to 3. The CRS may be defined only with respect to Δf=15 kHz. A pseudo-random sequence $r_{l,ns}(m)$ generated from a seed value based on a cell ID (identity) is subject to resource mapping as a complex-valued modulation symbol $a^{(p)}_{k,l}$. In this case, $n_s$ is a slot number within a single radio frame, p is an antenna port, and l is an OFDM symbol number within the slot. K is a subcarrier index. l,k is represented as in the following equation.

$$k = 6m + (v + v_{shift}) \bmod 6 \quad \text{[Equation 1]}$$

$$l = \begin{cases} 0, N^{DL}_{symb} - 3 & \text{if } p \in \{0, 1\} \\ 1 & \text{if } p \in \{2, 3\} \end{cases}$$

$$v_{shift} = N^{cell}_{ID} \bmod 6$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

In Equation 1, p denotes an antenna port, and $n_s$ denotes a slot number 0 or 1.

k has 6 shifted indices according to a cell ID ($N^{Cell}_{ID}$). Accordingly, cells having) cell IDs 0, 6, 12, . . . , that is, a multiple of 6, send CRSs in the same subcarrier location k.

In Equation 1, l is determined by the antenna port p, and may have a possible value of 0, 4, 7, or 11. Accordingly, the CRS is transmitted on an 0, 4, 7, 11 symbol.

A resource element (RE) allocated to the CRS of a single antenna port may not be used to send another antenna port and needs to be configured to be zero. Furthermore, in an MBSFN (multicast-broadcast single frequency network) subframe, the CRS is transmitted only in a non-MBSFN region.

Figure 10:
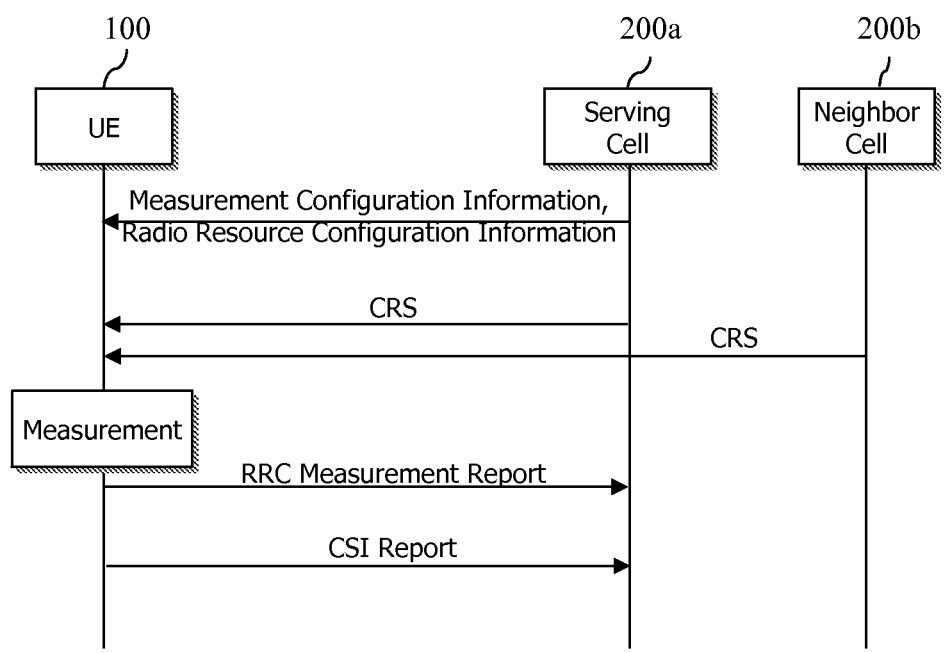
FIG. 10 illustrates measurement and measurement report procedures.

FIG. 10 illustrates measurement and measurement report procedures.

In a mobile communication system, a mobility support for UE 100 is essential. Accordingly, the UE 100 continues to measure quality of a serving cell that now provides service to the UE 100 and quality of neighbor cells. The UE 100 reports a measurement result to a network at a proper time, and the network provides optimal mobility to the UE through handover. Measurement for such a purpose is called radio resource management (RRM).

The UE 100 may monitor downlink quality of a primary cell (Pcell) based on a CRS. This is called RLM (Radio Link Monitoring). For such RLM, the UE 100 estimates downlink quality and compares the estimated downlink quality with thresholds, for example, Qout and Qin. The threshold Qout is defined as a level in which downlink reception cannot be stably performed, and corresponds to an 10% error of PDCCH transmission by taking into consideration a PCFICH error. The threshold Qin is defined as a level in which downlink may be very significantly reliable compared to the threshold Qout, and corresponds to an 2% error of PDCCH transmission by taking into consideration a PCFICH error.

As may be seen with reference to FIG. 10, when a serving cell 200a and a neighbor cell 200b send respective CRSs (Cell-specific Reference Signals) to the UE 100, the UE 100 performs measurement through the CRSs and sends an RRC measurement report message, including a measurement result, to the serving cell 200a.

In this case, the UE 100 may perform measurement using the following three methods.

1) RSRP (reference signal received power): This indicates the mean reception power of all REs that carry a CRS transmitted in the entire band. In this case, the mean reception power of all REs that carry a CSI RS instead of the CRS may be measured.

2) An RSSI (received signal strength indicator): this indicates reception power measured in the entire band. The RSSI includes all of a signal, interference, and thermal noise.

3) RSRQ (reference symbol received quality): this indicates a CQI, and may be determined to be an RSRP/RSSI according to a measurement bandwidth or subband. That is, the RSRQ means an SINR (signal-to-noise interference ratio). The RSRP does not provide sufficient mobility information, and thus RSRQ may be used in a handover or cell reselection process instead of RSRP.

RSRQ may be an RSSI/RSSP.

For the measurement, the UE 100 receives a measurement configuration (hereinafter also called "measconfing") information element (IE) from the serving cell 100a. A message including the measurement configuration IE is called a measurement configuration message. In this case, the measurement configuration IE may be received through an RRC connection reconfiguration message. If a measurement result satisfies a report condition within the measconfing information, the UE reports the measurement result to an eNodeB. A message including the measurement result is called a measurement report message.

The measurement configuration IE may include measurement object information. The measurement object information is information about an object on which UE may perform measurement. The measurement object includes at least one of an intra-frequency measurement target that is the subject of intra-cell measurement, an inter-frequency measurement target that is the subject of inter-cell measurement, and an inter-RAT measurement target that is the subject of inter-RAT measurement. For example, the intra-frequency measurement target may indicate a neighbor cell having the same frequency band as a serving cell. The inter-frequency measurement target may indicate a neighbor cell having a frequency band different from that of a serving cell. The inter-RAT measurement target may indicate a neighbor cell having an RAT different from the RAT of a serving cell.

Specifically, the measurement configuration IE includes an IE, such as that of Table 5.

TABLE 5

MeasConfig ::=
-- Measurement objects
    measObjectToRemoveList
    measObjectToAddModList The Measurement objects IE includes measObjectToRemoveList indicative of a list of measObject to be removed and measObjectToAddModList indicative of a list that may be newly added or modified.

measObject includes MeasObjectCDMA2000, MeasObjectEUTRA, and MeasObjectGERAN depending on a communication technology.

An MeasObjectEUTRA IF includes information applied for an intra-frequency or inter-frequency for E-UTRA cell measurement. The MeasObjectEUTRA IE may be represented as in Table 6.

TABLE 6

1) MeasObjectEUTRA
- neighCellConfig
   - measSubframePatternConfigNeigh-r10
2) MeasSubframePatternConfigNeigh-r10
   measSubframePatternNeigh-r10
   measSubframeCellList-r10

The MeasObjectEUTRA IE may be represented in more detail as follows.

TABLE 7

Description of MeasObjectEUTRA field carrierFreq
This configuration identifies a valid E-UTRA carrier frequency.
neighCellConfig
indicates information about the configuration of a neighbor cell.
measCycleSCell
parameter: $T_{measure\_scc}$
According to this parameter, a secondary cell (SCell) operates in a frequency indicated by measObject, and this parameter is used in a deactivated state.
measSubframeCellList
This is a list of cells to which measSubframePatternNeigh is applied. If this is not included, UE applies a time domain measurement resource restriction pattern to all neighbor cells.
measSubframePatternNeigh
This is a time domain measurement resource restriction pattern applied to measure RSRP and RSRQ on neighbor cells on a carrier frequency indicated by the carrierFreq.

As described above, the MeasObjectEUTRA IE includes informaiton about the configuration (i.e., NeighCellConfig) of a neighbor cell, a time domain measurement resource restriction pattern (i.e., the measurement subframe pattern or measSubframePatternNeigh of the neighbor cell) applied to perform measurement on the neighbor cell, and a list of cells to which the pattern is applied (i.e., measSubframeCellList).

The UE 100 also receive a radio resource configuration IE, as illustrated in FIG. 10.

The radio resource configuration IE is used to configure/modify/release a radio bearer or to modify a MAC configuration. The radio resource configuration IE includes subframe pattern information. The subframe pattern information is information about a measurement resource restriction pattern on a time domain in order to measure the RSRP, RSRQ of a serving cell (e.g., primary cell).

The radio resource configuration IE includes fields, such as those of the following table.

TABLE 8

- RadioResourceConfigDedicated
- measSubframePatternPCell-r10

The RadioResourceConfigDedicated field includes the following factors.

TABLE 9

Description of RadioResourceConfigDedicated field logicalChannelConfig
This is used to indicate whether a logical channel configuration is explicitly signaled for SRBs or configured as a default logical channel configuration for SRB1.
logicalChannelIdentity
A logical channel identifier for identifying both uplink (UL) and downlink (DL)
mac-MainConfig
An option used to indicate whether mac-MainConfig is explicitly signaled or configured as a default MAC main configuration.
measSubframePatternPCell
A time domain measurement resource restriction pattern used to perform measurement (RSRP, RSRQ) on a primary cell (PCell) (i.e., a primary cell) (or a serving cell).

As described above, the RadioResourceConfigDedicated field includes measSubframePatternPCell or measSubframePattern-Serv indicative of a time domain measurement resource restriction pattern (i.e., the measurement subframe pattern of a serving cell) used to perform measurement (RSRP, RSRQ) on a primary cell (PCell) (or a serving cell).

FIG. 11 illustrates an example of RBs to which CSI-RSs are mapped in reference signals.

A CSI-RS is used for channel measurement for the channel estimation and channel information of the PDSCH of LTE-A UE. CSI-RSs are deployed relatively sparsely in a frequency domain or time domain and may be punctured in the data region of a subframe or MBSFN subframe. If a CSI-RS is required to estimate a CSI, a CQI, PMI, and RI may be reported by UE.

A CSI-RS is transmitted through a 1, 2, 4, or 8 antenna port. Antenna ports used in this case are p=15, p=15, 16, p=15, . . . , 18, and p=15, . . . , 22. That is, a CSI-RS may be transmitted through 1, 2, 4, 8 antenna ports. A CSI-RS may be defined with respect to only a subcarrier duration $\Delta f=15$ kHz. For a CSI-RS, reference may be made to Paragraph 6.10.5 of 3GPP (3rd Generation Partnership Project) TS 36.211 V10.1.0 (2011-03) "Technical Specification Group Radio Access Network; Evolved Universal Terrestrial Radio Access (E-UTRA); Physical channels and modulation (Release 8)."

In the transmission of a CSI-RS, a maximum of 32 different configurations may be proposed in order to reduce ICI (inter-cell interference) in a multi-cell environment including a heterogeneous network (HetNet) environment. A CSI-RS configuration is different depending on the number of antenna ports within a cell and a CP. A neighbor cell may have a different configuration to the greatest extent. Furthermore, a CSI-RS configuration may be divided into a case where it is applied to both an FDD frame and TDD frame and a case where it is applied to only a TDD frame depending on a frame structure. In a single cell, a plurality of CSI-RS configurations may be used. A zero or one CSI-RS configuration may be used for UE that assumes a non-zero power CSI-RS, and zero or some CSI-RS configurations may be used for UE that assumes a zero power CSI-RS.

A CSI-RS configuration may be indicated by a high layer. For example, a CSI-RS-Config IE (information element) transmitted through a high layer may indicate a CSI-RS configuration. The following table illustrates an example of a CSI-RS-Config IE.

TABLE 10

```
CSI-RS-Config-r10 ::=  SEQUENCE {
    csi-RS-r10         CHOICE {
        release            NULL,
        setup              SEQUENCE {
            antennaPortsCount-r10        ENUMERATED {an1, an2, an4, an8},
            resourceConfig-r10           INTEGER (0..31),
            subframeConfig-r10           INTEGER (0..154),
            p-C-r10                      INTEGER (-8..15)
        }
    }                              OPTIONAL,              -- Need ON
    zeroTxPowerCSI-RS-r10 CHOICE {
        release            NULL,
        setup              SEQUENCE {
            zeroTxPowerResourceConfigList-r10   BIT STRING (SIZE (16)),
            zeroTxPowerSubframeConfig-r10       INTEGER (0..154)
        }
    }                              OPTIONAL               -- Need ON
}
-- ASN1STOP
```

Referring to Table 10, an "antennaPortsCount" field indicates the number of antenna ports used for the transmission of a CSI-RS. A "resourceConfig" field indicates a CSI-RS configuration. A "SubframeConfig" field and a "zeroTxPowerSubframeConfig" field indicate a subframe configuration in which a CSI-RS is transmitted.

A "zeroTxPowerResourceConfigList" field indicates the configuration of a zero power CSI-RS. In a 16-bit bitmap that configures the zeroTxPowerResourceConfigList" feel, a CSI-RS configuration corresponding to bits configured to be 1 may be configured as a zero power CSI-RS.

The sequence $r_{l,n_s}(m)$ of a CSI-RS may be generated as in the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 2]

$$m = 0, \ldots, N_{RB}^{max,DL} - 1$$

where, $$c_{int} = 2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In Equation 2, $n_s$ is a slot number within a radio frame, and 1 is an OFDM symbol number within the slot. c(i) is a pseudo random sequence and started from each OFDM symbol as $c_{init}$ indicated in Equation. $N_{ID}^{cell}$ means a physical cell ID.

In subframes configured to send a CSI-RS, a reference signal sequence $R_{l,ns}(m)$ is mapped to a complex value modulation symbols $a_{k,l}^{(p)}$ used as a reference symbol for an antenna port p.

The relation between $r_{l,ns}(m)$ and $a_{k,l}^{(p)}$ may be represented as in the following equation.

$$a_{k,l}^{(p)} = w_{l''} \cdot r(m)$$ [Equation 3]

In this case, $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI referencesignal configurations 0-19, normal cyclic prefix} \\ 2l'' & \text{CSI referencesignal configurations 20-31, normal cyclic prefix} \\ l'' & \text{CSI referencesignal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 2, (k", l") and $n_s$ are given in Table 5 and Table 6 to be described later. A CSI-RS may be transmitted in a downlink slot in which ($n_s$ mod 2) satisfies the conditions of Table 5 and Table 6 (In this case, mod means modular operation. That is, ($n_s$ mod 2) means the remainder obtained by dividing $r_s$ by 2).

The following table illustrates CSI-RS configurations in a normal CP.

TABLE 11

| CSI-RS configuration index | Number of configured CSI-RSs | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| TDD and FDD frame | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| TDD frame | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

The following table illustrates CSI-RS configuration in an extended CP.

TABLE 12

| CSI-RS configuration index | Number of configured CSI-RSs | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| TDD and FDD frame | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| TDD frame | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |

TABLE 12-continued

| CSI-RS configuration index | Number of configured CSI-RSs | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 24 | (6, 1) | 1 | | | | |
| 25 | (2, 1) | 1 | | | | |
| 26 | (1, 1) | 1 | | | | |
| 27 | (0, 1) | 1 | | | | |

In the above two tables, UE may send a CSI-RS only in a downlink slot that satisfies the condition of $n_s$ mod 2. Furthermore, UE does not send a CSI-RS in a subframe in which the transmission of a special subframe, CSI-RS of a TDD frame collides against a synchronization signal, a PBCH (physical broadcast channel), and a system information block type 1 (SystemInformationBlockType1) or a subframe in which a paging message가 is transmitted. Furthermore, in a se S, that is, S={15}, S={15, 16}, S={17, 18}, S={19, 20} or S={21, 22}, a resource element in which the CSI-RS of a single antenna port is transmitted is not used for the transmission of the CSI-RS of a PDSCH or another antenna port.

The following table illustrates an example of a subframe configuration in which a CSI-RS is transmitted.

TABLE 13

| CSI-RS-SubframeConfig $I_{CSI-RS}$ | CSI-RS cycle $T_{CSI-RS}$ (subframe) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Referring to Table 13, the cycle $T_{CSI-RS}$ and offset $\Delta_{CSI-RS}$ of a subframe in which a CSI-RS is transmitted may be determined depending on a CSI-RS subframe configuration $I_{CSI-RS}$. In Table 13, the CSI-RS subframe configuration may be any one of the "SubframeConfig" field and "ZeroTxPowerSubframeConfig" field of the CSI-RS-Config IE in the above table. The CSI-RS subframe configuration may be separately configured with respect to a non-zero power CSI-RS and a zero power CSI-RS.

FIG. 11 illustrates resource elements used for CSI-RSs when a CSI-RS configuration index is 0 in a normal CP structure. Rp illustrates a resource element used for CSI-RS transmission on an antenna port p. Referring to FIG. 11, a CSI-RS for antenna ports 15 and 16 is transmitted through resource elements corresponding to the third subcarrier (i.e., subcarrier index 2) of the sixth and the seventh OFDM symbols (i.e., OFDM symbol indices 5, 6) of a first slot. A CSI-RS for antenna ports 17 and 18 is transmitted through resource elements corresponding to the ninth subcarrier (i.e., subcarrier index 8) of the sixth and the seventh OFDM symbols (OFDM symbols indices 5, 6) of the first slot. A CSI-RS for antenna ports 19 and 20 is transmitted through the same resource elements as those in which the CSI-RS for the antenna ports 15 and 16 is transmitted. A CSI-RS for the antenna ports 21 and 22 is transmitted through the same resource elements as those in which the CSI-RS for the antenna ports 17 and 18 are transmitted.

IF a CSI-RS through eight antenna ports is transmitted to UE, the UE may receive an RB to which R15 to R22 has been mapped. That is, the UE may receive a CSI-RS having a specific pattern.

Hereinafter, a small cell is described below.

<Introduction of Small Cell>

In a next-generation mobile communication system, it is expected that a small cell having a small coverage radius will be added to the coverage of an existing cell and a small cell may process more traffic. The existing cell is called a macro cell because it has greater coverage than the small cell. This is described below with reference to FIG. 7.

Figure 12:
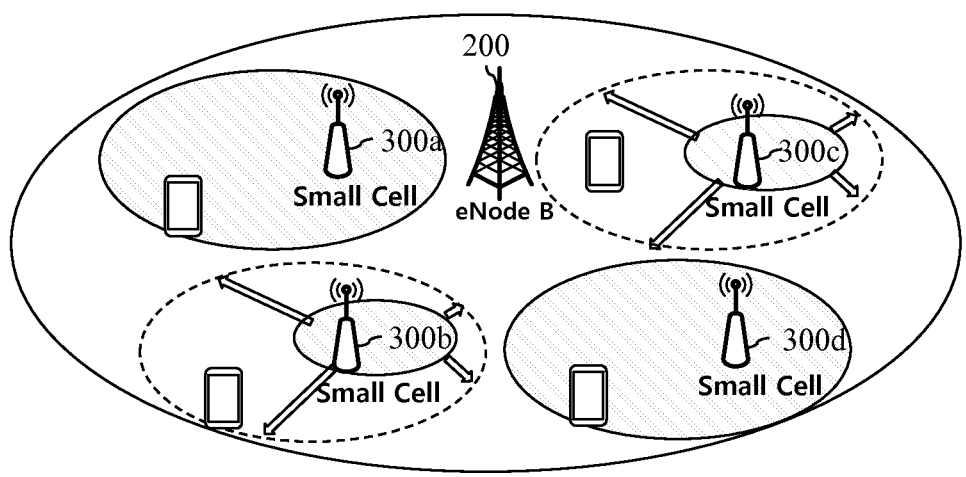
FIG. 12 is a diagram illustrating a heterogeneous network environment in which a macro cell and small cells having a possibility that they may become a next-generation wireless communication system are mixed.

FIG. 12 is a diagram illustrating a heterogeneous network environment in which a macro cell and small cells having a possibility that they may become a next-generation wireless communication system are mixed.

Referring to FIG. 12, a macro cell according to an existing eNodeB 200 has a heterogeneous network environment in which overlaps with small cells according to one or more small eNodeBs 300a, 300b, 300c, and 300d. The existing eNodeB is also called a macro eNodeB (MeNB) because it provides coverage greater than the small eNodeB. In this specification, a macro cell and a macro eNodeB are interchangeably used. UE connected to the macro cell 200 may be called macro UE. The macro UE receives a downlink signal from a macro eNodeB and sends an uplink signal to a macro eNodeB.

In such a heterogeneous network, the coverage gap of a macro cell may be filled by configuring the macro cell as a primary cell (Pcell) and configuring the small cell as a secondary cell Scell. Furthermore, overall performance can be boosted by configuring a small cell as a primary cell (Pcell) and configuring a macro cell as a secondary cell Scell.

However, inter-cell interference may be further added due to the introduction of such small cells.

The most fundamental method for solving such an interference problem is to differently use frequencies between cells. However, the frequencies are rare and expensive resources, and thus a method through frequency partition is not welcomed by providers.

Accordingly, in 3GPP, such an inter-cell interference problem has been intended to be solved through time partition.

Accordingly, in recent 3GPP, active research is being carried out on eICIC (enhanced inter-cell interference coordination) as one of interference cooperation methods.

<Introduction of eICIC>

A time partition method introduced into LTE Release-10 is called an enhanced ICIC (Enhanced inter-cell interference Coordination) meaning that it has been advanced from the existing frequency partition method. In this method, a cell that generates interference is called an aggressor cell or primary cell, and a cell subjected to interference is called a victim cell or secondary cell. In a specific subframe, an aggressor cell or primary cell stops data transmission so that UE can maintain access to a victim cell or secondary cell in the corresponding subframe. That is, in this method, if heterogeneous cells coexist, a cell on one side rarely sends an interference signal because it temporarily stops the transmission of a signal to UE subjected to very great interference in any region.

A specific subframe in which data transmission is stopped is called an ABS (Almost Blank Subframe). In subframe corresponding to the ABS, any data is not transmitted other than essential control information. The essential control information may be a CRS, for example. Accordingly, data is not transmitted on a subframe to which an ABS has been applied, but only a CRS signal is transmitted on a symbol No. 0, 4, 7, 11.

Figure 13:
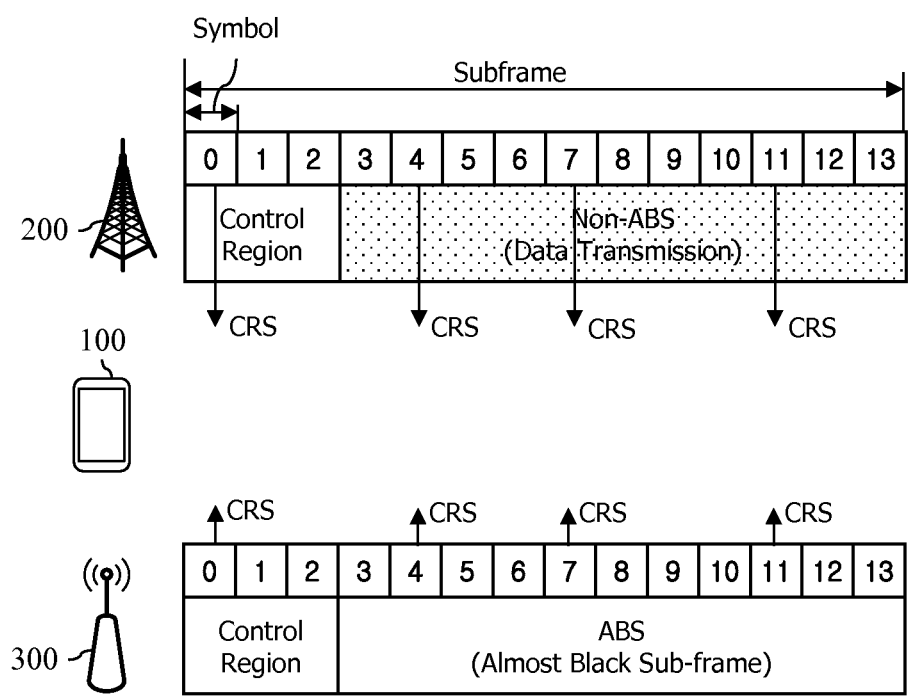
FIG. 13 is an examplary diagram of eICIC (enhanced Inter-Cell Interference Coordination) for solving interference between eNodeBs.

FIG. 13 is an examplary diagram of eICIC (enhanced Inter-Cell Interference Coordination) for solving interference between eNodeBs.

Referring to FIG. 13, the eNodeB 200 of a macro cell performs data transmission in the data region of an illustrated subframe.

In this case, in order to solve interference, the eNodeB 300 of a small cell uses an eICIC. That is, if the eICIC is applied, a corresponding subframe is managed depending on an ABS, and any data may not be transmitted in the data region.

However, in the subframe managed depending on the ABS, only a CRS may be transmitted on a symbol No. 0, 4, 7, 11.

If small cells are deployed as described above, an inter-cell interference problem may be worsened. In order to solve this problem, as illustrated in FIG. 13, the coverage size of a small cell may be reduced depending on the situation. Alternatively, the small cell may be off and then on depending on the situation.

Figure 14:
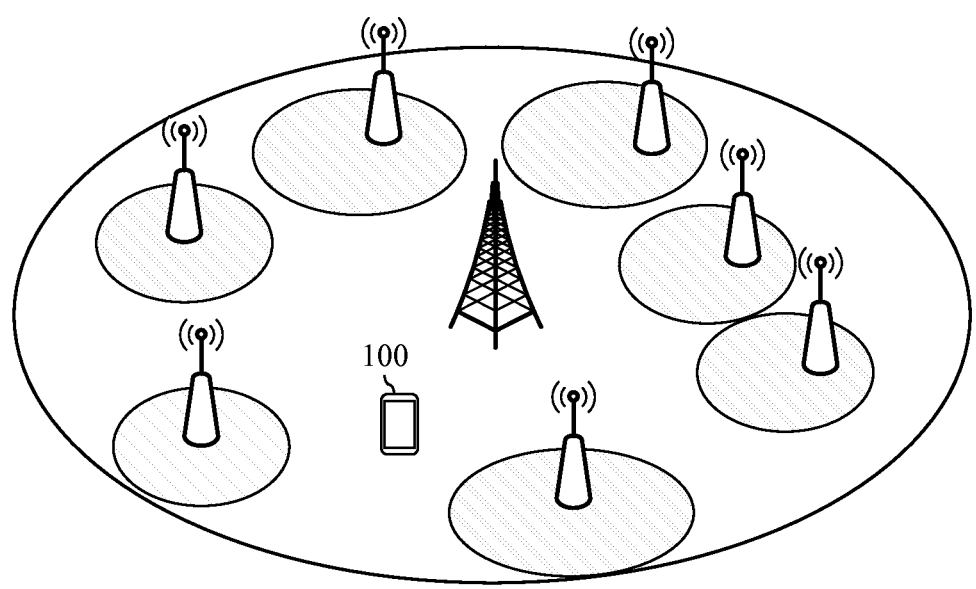
FIG. 14 is an examplary diagram illustrating the situation in which small cells have been densely deployed.

FIG. 14 is an examplary diagram illustrating the situation in which small cells have been densely deployed.

FIG. 14 illustrates the state in which small cells have been densely deployed within the coverage of a macro cell. In this state, it may be difficult for UE 100 to detect the small cells within a short time. In particular, as described above, cell detection is performed through the reception of a PSS/SSS. However, if many small cells send PSS/SSSs at the same timing, that is, on subframes Nos. 0 and 5, it may be difficult for the UE 100 to receive all the PSS/SSSs at once. Furthermore, if the small cells send the PSS/SSSs on the subframes Nos. 0 and 5 at the same time, mutual interference may be generated. As a result, it may be difficult for the UE 100 to correct receive the PSS/SSSs.

<Disclosure of this Specifications>

Accordingly, a disclosure of this specification is to propose a scheme for solving such a problem.

Figure 15:
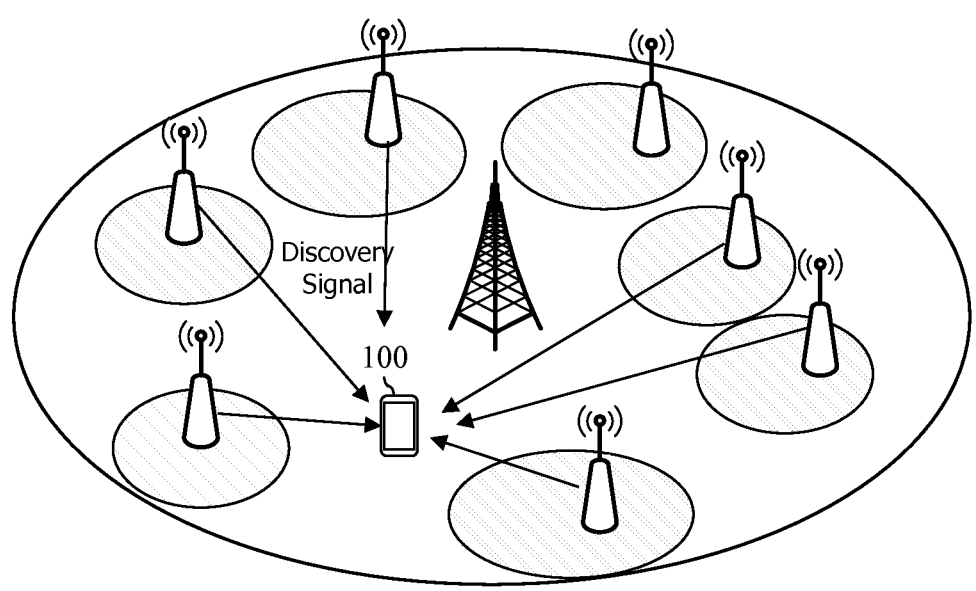
FIG. 15 illustrates an example in which small cells send discovery signals according to the disclosure of this specification.

FIG. 15 illustrates an example in which small cells send discovery signals according to the disclosure of this specification.

In order to solve the problem, as may be seen with reference to FIG. 15, a disclosure of this specification proposes a method in which in order for UE to efficiently detect small cells, a small cell sends a new discovery signal (DS) in addition to an existing PSS/SSS. The discovery signal may also be called a discovery reference signal (DRS). Accordingly, the UE needs to perform a cell search process or cell detection process using the discovery signal in addition to the existing PSS/SSS.

In this case, the discovery signal may mean a signal that has a long cycle and that is cyclically transmitted.

Such a discovery signal may be transmitted by an RRH (remote radio head) or a transmission point in addition to a small cell.

The discovery signal may have the following characteristics.

- It allows more cells to be detected compared to existing PSS/SSS and a CRS.
- It allows more cells to be detected for a short time, for example, during a single subframe.
- It allows measurement to be performed for a short time, for example, during a single subframe.
- It supports the measurement of a small cell that performs on/off operations. In other words, although a small cell is in the OFF state, the small cell sends a discovery signal so that UE may perform measurement based on the discovery signal.

A discovery signal may be implemented as the following signals.
(a) PSS/SSS/CSI-RS/CRS or PSS/SSS/configurable CRS
(b) PSS/SSS/CRS
(c) PSS/SSS/CSI-RS
(d) PSS/SSS/CSI-RS/CRS or PSS/SSS/configurable CSI-RS Such a discovery signal may be used for coarse time/frequency tracking and measurement.

A discovery signal needs to satisfy the following requirements.
It needs to support coarse time synchronization assuming that an initial timing error is very high (e.g., +−2.5 ms)
It needs to support coarse frequency synchronization assuming that an initial frequency error is very high (e.g., 20 kHz).
It needs to support the detection of at least three cells.
The cycle of a discovery signal is determined by taking into consideration the following restrictions.
Several measurement gap durations (or measurement gap periods): 40 msec, 80 msec, 160 msec, or 320 msec
A DRX cycle and alignment: 10, 20, 32, 40, 64, 80, 128, 160, 256, 320, 512, 640, 1024, 1280, 2048, 2560
If a PSS/SSS is transmitted as part of a discovery signal, the cycle of the discovery signal becomes a multiple of 5 msec. A common PSS/SSS transmitted in the ON state needs to be substituted with the PSS/SSS of a discovery signal. However, such a restriction may not be applied if a small cell does not send a discovery signal in the ON state. Alternatively, in order to minimize the influence of existing UE other than UE improved according to the disclosure of this specification, a PSS/SSS for a discovery signal in addition to the existing PSS/SSS may be separately transmitted. As described above, the PSS/SSS separately transmitted for a discovery signal in addition to an existing PSS/SSS may be called a DS-PSS (or DRS-PSS)/DS-SSS (or DRS-SSS). In this case, a cell ID that is a base for the DS-PSS (or DRS-PSS)/DS-SSS (or DRS-SSS) may be different from a cell ID that is a base for the PSS/SSS.

If one or more of a CRS and a CSI-RS are separately transmitted for a discovery signal in addition to an existing CRS, such a CRS and CSI-RS may be respectively called a DS-CRS (or DRS-CRS) and DS-CSI-RS (or DRS-CSI-RS). Furthermore, if a PRS is separately transmitted for a discovery signal in addition to an existing PRS, such as a PRS may be called a DS-PRS (or DRS-PRS).

Furthermore, in this specification, a DRS-PSS, a DRS-SSS, a DRS-CRS, a DRS-CSI-RS, and a DRS-PRS mean respective PSS, SSS, CRS, CSI-RS, and PRS included in respective discovery signals.

If a DRS transmitted by a specific cell in a long cycle has one of the aforementioned (a)-(d) types, the sequence and resources of a DRS-PSS, DRS-SSS, DRS-CRS, and DRS-CSI-RS may be transmitted in forms most similar to the existing PSS, SSS, CRS, and CSI-RS, but may be different from the conventional PSS, SSS, CRS, and CSI-RS in such a manner that they are transmitted on other scrambling initial parameters and/or resource locations (e.g., other frequency/time resources). More specifically, a DRS-CSI-RS may use the resources pattern of an existing CSI-RS, but may have a different transmission subframe and cycle or scrambling ID. That is, the scrambling ID of a DRS-CSI-RS and CSI-RS transmitted by a specific cell, the number of antenna ports, and a transmission cycle/offset may be different.

Figure 16:
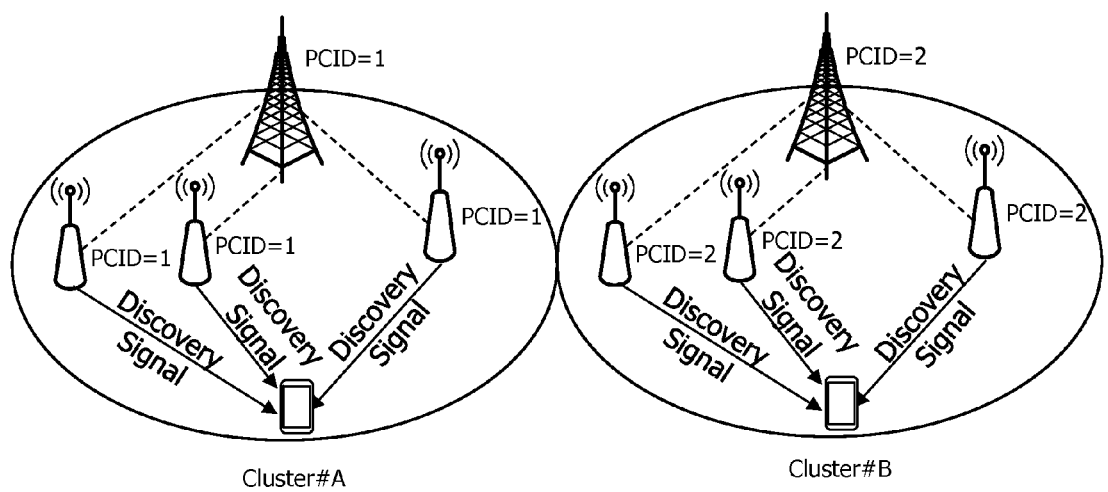
FIG. 16 illustrates an example in which a plurality of transmission points (TPs) (or small cells) within a cluster uses the same physical cell identifier (PCID).

FIG. 16 illustrates an example in which a plurality of transmission points (TPs) (or small cells) within a cluster uses the same physical cell identifier (PCID).

As may be seen with reference to FIG. 16, a plurality of transmission points (or a small cell) is grouped for each cluster, and transmission points (or small cells) within each cluster may use the same physical cell identifier (PCID) as its own macro eNodeB. Such an environment may be called a sharing cell-ID scenario. In this case, the PCID may mean a cell-unique ID used for PSS/SSS and CRS transmission as in a current LTE technology or may be a separate cluster ID in common used in a specific cluster.

In such a environment, in order to obtain an additional cell-splitting gain between a plurality of transmission points within a cluster, unique ID information may be assigned to each transmission point. As described above, unique ID information for each transmission point may be called a transmission point ID. As a representative embodiment, each transmission point ID may be used as the sequence scrambling-initial parameter (e.g., scramblingIdentity) of any one of a CSI-RS or discovery signal transmitted by a corresponding transmission point and may be used in the transmission of a unique reference signal (RS) for each other transmission point.

In this specification, the state in which each transmission point sends a unique discovery reference signal (DRS) for each unique transmission point is taken into consideration. A DRS may be configured as several RSs. Each transmission point is not assumed to send several RSs. For example, if it is assumed that a DRS is configured as a DRS-PSS/DRS-SSS/DRS-CSI-RS/DRS-CRS, the DRS-PSS/DRS-SSS/DRS-CRS may be transmitted in each transmission point or may be transmitted in representative transmission points.

One of roles performed by UEs through a discovery signal is RSRP/RSRQ measurement as described above. In an existing system, UE performs RSRP measurement and RSRQ measurement through a CRS. The same is true of the measurement of a small cell. In this case, UE may perform measurement on a small cell that sends a discovery signal through the discovery signal. However, since a CRS and a DRS may have different sequences, RE locations, and RE densities, the value of RSRP, RSRQ measured through a CRS may be different from the value of RSRP, RSRQ measured through a discovery signal with respect to the same small cell. Hereinafter, for convenience of description, the value of RSRP, RSRQ measured using a CRS in a prior art is respectively called C-RSRP, C-RSRQ. Unlike in the prior art, RSRP, RSRQ measured through a discovery signal is respectively called D-RSRP, D-RSRQ.

UE may receive a DRS measurement timing configuration (DMTC), that is, timing information for DRS-based measurement, from an eNodeB. The DMTC may be included in "measobject" within the measurement configuration (measconfig) and received. Such a DMTC may include a cycle and an offset value and may additionally include the value of duration.

If an ABS is managed in order to reduce inter-cell interference, UE is unaware that which subframe has been configured as an ABS. For example, if an aggressor cell has configured an ABS, an interference level is greatly changed for each subframe. Accordingly, some UEs may not receive resources allocated thereto on specific subframes. If UE does not distinguish between a subframe in which an ABS has been configured and a subframe in which an ABS has not been configured, the UE needs to simply take the mean of interference levels that have been severely changed for each subframe and report the mean. Accordingly, an inaccurate measurement result is reported.

In order to solve such a problem, the aforementioned time domain measurement resource restriction pattern, that is, a measurement subframe pattern, may be used. By sending information about such a measurement subframe pattern to UE, the UE may perform measurement only on a subframe of a specific pattern.

If a neighbor small cell has performed On/Off operations and thus it is difficult for UE to perform measurement on the neighbor small cell using an existing CRS, the UE may perform measurement using a discovery signal from the neighbor small cell. In this case, however, a problem may occur because it is not clear whether UE has to perform measurement on a small cell, operating in the ON state as the serving cell of the UE, using which one of the CRS and the discovery signal.

If another small cell generates a discovery signal through a combination of a PSS/SSS/CRS (i.e., DRS-PSS/DRS-SSS/DRS-CRS) or a PSS/SSS/CSI-RS (i.e., DRS-PSS/DRS-SSS/DRS-CSI-RS) and sends the discovery signal on a plurality of subframes (e.g., 6 or 10 subframes), but configures some of the subframes as ABSs, a problem may occur because it is not clear whether UE has to perform measurement only on a limited subframe indicated by a measurement subframe pattern with respect to the discovery signal.

In accordance with another existing definition, an RSSI is calculated based on a measurement result on a specific OFDM symbol including a CRS. However, if such an existing definition is directly applied to a discovery signal, a problem may occur. The reason for this is described below. First, if the existing definition is also applied to the discovery signal, the RSSI of the discovery signal is calculated based on a measurement result only on an OFDM symbol including the discovery signal. However, it is assumed that a neighbor small cell sends a discovery signal in OFF state. In this case, since no data is transmitted on a downlink subframe, a measured RSSI is inaccurate. Accordingly, there is a problem in that the calculation of RSRQ becomes inaccurate.

Schemes for solving the aforementioned problems are described below.

I. Reference Signal for RSRP/RSRQ Measurement of Serving Cell

First, an example in which UE has to perform RSRP/RSRQ measurement on a serving cell that belongs to the serving cells of the UE and that may send a discovery signal using which one of a CRS and a discovery signal is described below. In this case, if specifically described in the following example, the serving cell of the UE may be understood to be a primary cell (PCell).

First, if the discovery signal measurement timing configuration (DMTC) of each serving cell has not been received, UE may perform CRS-based RSRP/RSRQ measurement. In this case, the DMTC means that a serving cell configures a subframe on which UE may perform measurement is configured in the UE. The DMTC may include a subframe cycle "ubframeperiod", a subframe offset, and/or subframe duration.

If UE has received a DMTC for each serving cell, the UE may operate according to any one of the following schemes.

In a first scheme, while UE is connected to a serving cell, the serving cell is always in the ON state. Accordingly, the UE may always perform CRS-based RSRP/RSRQ measurement on its own serving cell. That is, although the serving cell of the UE sends a discovery signal, the UE performs RSRP/RSRQ measurement based on a CRS other than a discovery signal. In other words, when performing an RSRP/RSRQ report on its serving cell, the UE may report only a C-RSRP, C-RSRQ value. In contrast, the UE may perform discovery signal-based RSRP/RSRQ measurement only when it tries to perform measurement on a neighbor cell. Such a first scheme is described in more detail below with reference to the following figures.

Figure 17A:
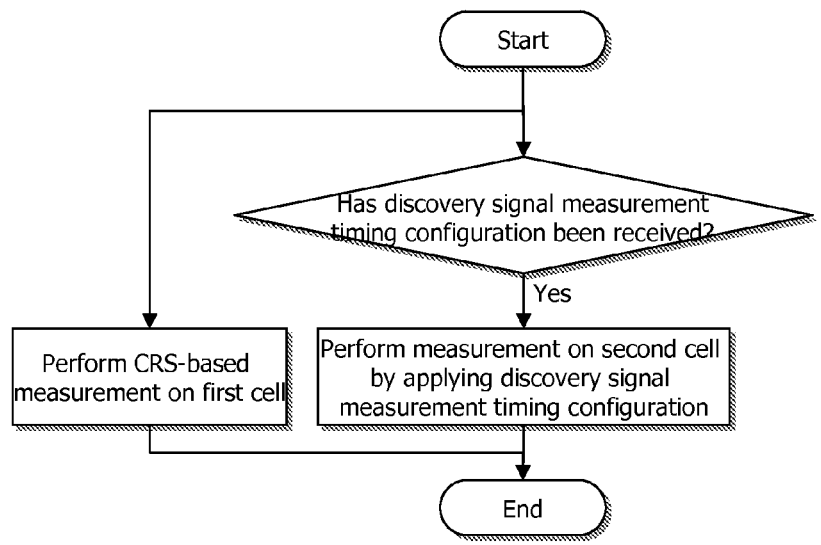
FIG. 17a is an examplary diagram of a first solution regarding that measurement will be performed using which one of a CRS and a DS.

FIG. 17a is an examplary diagram of the first solution regarding that measurement will be performed using which one of a CRS and a DS.

As may be seen with reference to FIG. 17a, if UE receives a discovery signal measurement timing configuration (DMTC), the UE may perform measurement on a second cell using the DMTC. In contrast, the UE may perform CRS-based measurement without applying the DMTC to a first cell.

In this case, the first cell means a primary cell (Pcell) of the serving cells of the UE. Furthermore, the second cell means a cell other than the primary cell and includes, for example, a secondary cell (Scell) or a neighbor cell.

If the first cell is the primary cell (Pcell), the UE may receive the measurement subframe pattern (e.g., measSubframePatternPCell) of the primary cell (Pcell). In this case, the UE may perform CRS-based measurement on the primary cell (Pcell) by applying the measurement subframe pattern. In other words, the UE may perform CRS-based measurement on a subframe indicated by the measurement subframe pattern of the primary cell (Pcell).

Figure 17B:
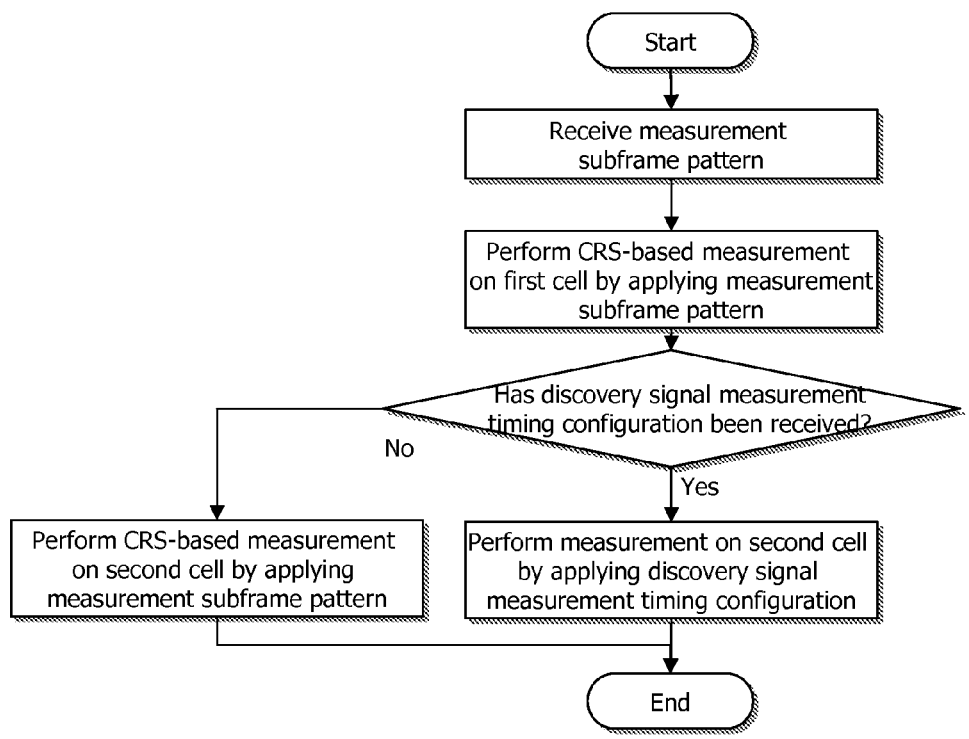
FIG. 17b is a more detailed examplary diagram of the first solution regarding that measurement will be performed using which one of a CRS and a DS.

FIG. 17b is a more detailed examplary diagram of the first solution regarding that measurement will be performed using which one of a CRS and a DS.

Referring to FIG. 17b, UE receives a measurement subframe pattern. In this case, the reception includes both the reception of the measurement subframe pattern of a primary cell (Pcell) and the reception of the measurement subframe pattern of a neighbor cell.

Accordingly, the UE performs CRS-based measurement by applying the measurement subframe pattern to a first cell, for example, a primary cell (Pcell). That is, the UE performs measurement using a CRS received from the first cell, for example, the primary cell (Pcell) on a subframe indicated by the measurement subframe pattern.

If the UE receives a DMTC, the UE performs measurement on a second cell by applying the DMTC. If the UE does not receive a DMTC, the UE performs CRS-based measurement by applying a measurement subframe pattern. Specifically, if the UE does not receive a DMTC, the UE performs measurement using a CRS received from the second cell on a subframe indicated by a measurement subframe pattern.

A second solution and third solution are described below.

In accordance with the second scheme, UE may perform discovery signal-based RSRP/RSRQ measurement on a serving cell. In this case, the UE does not distinguish between the serving cell and a neighbor cell. If the UE receives the DMTC of a specific cell, the UE may perform discovery signal-based RSRP/RSRQ measurement. In this case, the UE may report only D-RSRP and D-RSRQ values when reporting RSRP/RSRQ measurement results of its own serving cell.

In accordance with the third scheme, UE may perform CRS-based RSRP/RSRQ measurement or may perform discovery signal-based RSRP/RSRQ measurement. That is, the UE may perform CRS- or discovery signal-based measurement or may perform both CRS-based measurement and discovery signal-based measurement based on a specific-RS without being limited to specific measurement. In this case, the UE may report a C-RSRP/C-RSRQ and/or D-RSRP/D-RSRQ value to an eNodeB. In this case, the UE may report RSRP/RSRQ values to the eNodeB and may also report whether corresponding RSRP/RSRQ values is a CRS-based measurement value or a discovery signal-based measurement value.

In this case, when reporting the RSRP/RSRQ values to the eNodeB, the UE may transfer information about whether the corresponding RSRP/RSRQ value is a CRS-based measurement value or a discovery signal-based measurement value.

If UE may perform discovery signal-based RSRP/RSRQ measurement, both a DS-CRS and a DS-CSI-RS may have been included in the discovery signal. In this case, the UE may use the DS-CRS or DS-CSI-RS for RSRP/RSRQ measurement. Alternatively, the UE may use both the DS-CRS and DS-CSI-RS .

Whether UE has to perform RSRP/RSRQ measurement on a specific transmission point using a DS-CRS or a DS-CSI-RS may be different depending on a cell ID operation method (i.e., a sharing cell ID operation method or a non-sharing cell ID operation method). In the non-sharing cell ID operation method, a DS-CRS (and DS-CSI-RS) that is different (distinguished) for each transmission point is transmitted. In the sharing cell ID operation method, the same DS-CRS (not distinguished) between transmission points is transmitted and only a DS-CSI-RS is transmitted (so that it is distinguished). In this case, UE may not determine whether it has to perform RSRP/RSRQ measurement using which RS because it is unable to know that a specific cell or transmission point operates in the sharing cell ID operation method or the non-sharing cell ID operation method.

To this end, an eNodeB may notify the UE whether the UE has to perform the RSRP/RSRQ measurement using the DS-CRS (or CRS) or the DS-CSI-RS (or CSI-RS) through high layer signaling. If an eNodeB has configured that UE has to perform RSRP/RSRQ measurement using a DS-CRS through high layer signaling, the UE may perform the RSRP/RSRQ measurement using the DS-CRS and report a measurement result to the eNodeB. Alternatively, if the eNodeB has configured that the UE has to perform the RSRP/RSRQ measurement using a DS-CSI-RS through high layer signaling, the UE may perform the RSRP/RSRQ measurement using the DS-CSI-RS and report a measurement result to the eNodeB.

II. RSRP/RSRQ Measurement if Measurement Subframe is Configured

As described above, if UE receives a DMTC and also receives a measurement subframe pattern, there is a problem in that the UE has to perform measurement on which subframe. More specifically, if UE receives a DMTC, the UE has to perform measurement on a subframe indicated in the DMTC. Furthermore, if UE receives a measurement subframe pattern, the UE needs to perform measurement on a subframe indicated by the measurement subframe pattern. However, if a subframe indicated by the DMTC is not exactly identical with a subframe indicated by the measurement subframe pattern, it is not clear that the UE has to perform measurement on which subframe.

Solutions for such a problem are described below.

First, the following solutions may be based on a precondition in which a measurement subframe pattern has been configured based on the timing of a serving cell so that UE may perform restricted measurement although it is unaware of the SFN of a neighbor cell and a subframe index by taking into consideration the state in which timing is not synchronized between the serving cell and neighbor cell of the UE (i.e., an asynchronous case). In this case, the serving cell may be the primary cell (PCell) of the UE or the PCell of a secondary cell group (SCG), a specific secondary cell Scell, or a cell that sends assistance information by taking into consideration an environment, such as a CA or dual connectivity.

A first solution is an example in which a discovery signal includes a PSS/SSS/CSI-RS or a PSS/SSS/CRS/CSI-RS. As described above, if a discovery signal includes a PSS/SSS/CSI-RS or a PSS/SSS/CRS/CSI-RS, UE may perform RSRP/RSRQ measurement through a corresponding CSI-RS (i.e., DS-CSI-RS). In this case, in order to reduce interference, the DS-CSI-RSs may be transmitted using different scrambling indices and/or RE locations between neighboring cells or transmission points so that they are orthogonal to each other. Accordingly, in this case, the UE does not need to perform restricted measurement on a subframe indicated in a measurement subframe pattern received from an eNodeB. Accordingly, the first solution proposes that if UE performs discovery signal-based RSRP/RSRQ measurement (if D-RSRP, D-RSRQ are measured), the UE neglects a measurement subframe pattern although the UE receives the measurement subframe pattern and performs measurement. In this case, the UE may apply the measurement subframe pattern, that is, use measSubframePatternPCell, measSubframePatternNeigh as a CRS only when performing RSRP/RSRQ measurement.

A second solution is an example in which a discovery signal includes a PSS/SSS/CRS or a PSS/SSS/CRS/CSI-RS.

If a discovery signal includes a PSS/SSS/CRS, UE may perform RSRP/RSRQ measurement through a corresponding CRS (i.e., DS-CRS). Alternatively, if a discovery signal includes a PSS/SSS/CRS/CSI-RS, UE may perform RSRP/RSRQ measurement using a DS-CRS and/or a DS-CSI-RS. In this state, if the UE has received a measurement subframe pattern and configured the measurement subframe pattern, the UE may perform RSRP/RSRQ measurement as follows. In the following contents, an example in which a DS-CRS is included in a discovery signal is described, but the present invention may also be applied to a case where a DS-CRS is not included in a discovery signal, but only a DS-CSI-RS is included in the discovery signal (i.e., the discovery signal includes a PSS/SSS/CSI-RS).

In the first embodiment of the second solution, UE may perform discovery signal-based measurement on a subframe overlapping with a subframe that belongs to subframes indicated by a measurement subframe pattern and that is indicated by a DMTC. That is, although UE measures RSRP/RSRQ through a discovery signal according to a DMTC, the UE needs to perform measurement on a restricted subframe indicated by a measurement subframe pattern. In other words, although UE performs RSRP/RSRQ measurement through a discovery signal according to a DMTC as well as a CRS, a measurement subframe pattern, that is, measSubframePatternPCell, measSubframePatternNeigh, may be applied. A detailed flow is described below with reference to FIG. 18.

Figure 18:
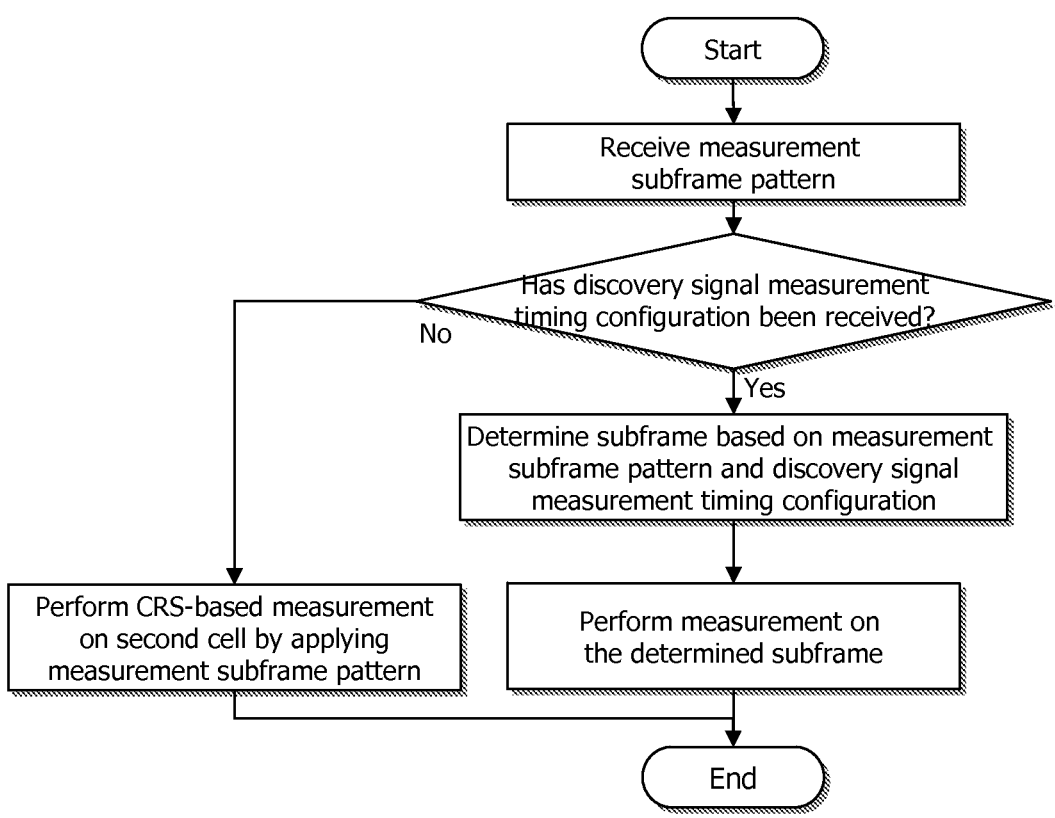
FIG. 18 illustrates a process of determining a subframe on which UE will perform measurement if both a measurement subframe pattern and a DMTC are used.

FIG. 18 illustrates a process of determining a subframe on which. UE will perform measurement if both a measurement subframe pattern and a DMTC are used.

As may be seen with reference to FIG. 18, UE receives a measurement subframe pattern. Furthermore, if the UE also receives a DMTC, the UE selects a subframe on which measurement is to be performed based on both the measurement subframe pattern and the DMTC and performs measurement on the selected subframe. Specifically, the UE selects a subframe overlapping with a subframe that belongs to subframes indicated by the measurement subframe pattern and that is indicated by the DMTC. This is described below with reference to FIGS. 19a and 19b.

Figure 19A:
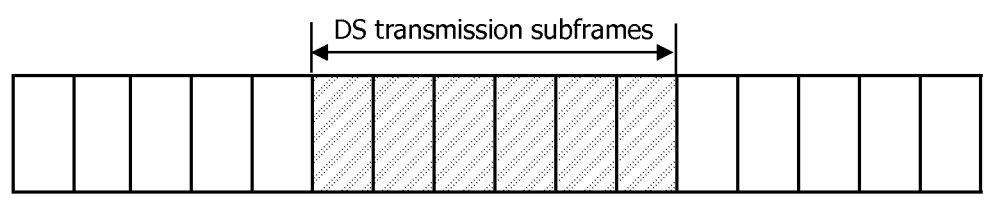
FIGS. 19a and 19b illustrate examples in which a subframe on which measurement is to be performed based on both a measurement subframe pattern and a DMTC.
Figure 19B:
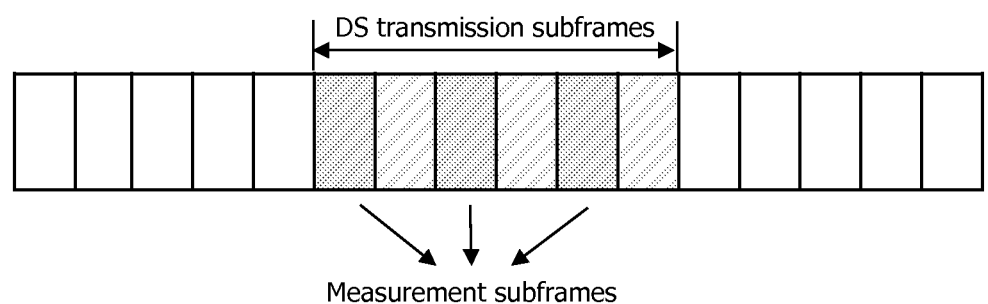

FIGS. 19a and 19b illustrate examples in which a subframe on which measurement is to be performed based on both a measurement subframe pattern and a DMTC.

As illustrated in FIG. 19a, in accordance with discovery signal measurement configuration (DMTC) timing, a discovery signal may be received on a plurality of subframes (e.g., 6 subframes). In this case, a DS-PSS, DS-SSS may be received on some (e.g., one) of the subframes or on all of the subframes, but a DS-CSI-RS may be received on all the subframes.

Referring to FIG. 19b, UE may perform measurement only on a subframe overlapping with a subframe that belongs to subframes indicated by a DMTC and that is indicated by a measurement subframe pattern.

In the second embodiment of the second solution, by taking into consideration that a discovery signal is transmitted through a small number of subframes, for example, one subframe, although a DS-CRS is included in the discovery signal, to perform measurement only on a restricted subframe indicated by a measurement subframe pattern may be meaningless. Accordingly, if UE performs RSRP/RSRQ measurement using a discovery signal (i.e., if D-RSRP, D-RSRQ is measured), although the UE has received a measurement subframe pattern, the UE may neglect the measurement subframe pattern and perform measurement. In this case, the measurement subframe pattern, that is, measSubframePatternPCell, measSubframePatternNeigh, may be applied only when the UE performs RSRP/RSRQ measurement using a CRS. More specifically, if measSubframePatternNeigh is configured, the UE may perform CRS-based measurement, assuming that the UE sends the CRS in the case of a cell belonging to a measurement object (or a neighbor cell list) including measSubframePatternNeigh. In other words, when the measurement subframe pattern is received, the UE may assume that corresponding cells are always in the ON state. Alternatively, an eNodeB may provide notification of the ON/OFF state of the corresponding cells so that the UE performs measurement using the CRS on a restricted subframe indicated by the measurement subframe pattern if a corresponding cell is ON. In contrast, if a corresponding cell is OFF, the UE may perform measurement using a discovery signal by neglecting the measurement subframe pattern, that is, without being restricted by a subframe indicated by the measurement subframe pattern. If UE has been configured to detect the discovery signal of a corresponding cell or to perform measurement using a discovery signal, the UE may neglect a measurement subframe pattern and perform discovery signal-based measurement. In this case, the UE may perform both a CRS-based measurement report and a discovery signal-based measurement report.

If discovery signal-based RSRP/RSRQ measurement is to be performed, whether or not to apply a measurement subframe pattern may be different depending on the type of discovery signal and a transmission subframe region.

Accordingly, this specification proposes that when UE performs discovery signal-based RSRP/RSRQ measurement, an eNodeB notifies the UE that the UE has to use which one of the first embodiment and the second embodiment (i.e., when the UE performs discovery signal-based RSRP/RSRQ measurement, whether a restricted subframe indicated by a measurement subframe pattern will be applied or not) through high layer signaling. Specifically, when discovery signal-based RSRP/RSRQ measurement is performed, whether the first embodiment scheme or the second embodiment scheme will be used may be configured for each frequency or each measurement object. Such a configuration may be performed in such a manner that each of or both measSubframePatternPCell and measSubframePatternNeigh are applied to a case where CRS-based RSRP/RSRQ measurement is performed or a case where RSRP/RSRQ measurement based on both a discovery signal and a CRS is performed. Specifically, whether specific measSubframePatternNeigh is applied to a case where only CRS-based RSRP/RSRQ measurement is performed or a case where RSRP/RSRQ measurement based on both a discovery signal and a CRS is performed may be configured for each measurement object. Since measSubframePatternNeigh is present in each measurement object, information indicating that specific measSubframePatternNeigh is also applied to a case where RSRP/RSRQ measurement based on both a discovery signal and a CRS is performed may be included in the measurement object. In this case, there is an advantage in that flexibility can be provided to a network.

III. Improvement of RSSI Definition

As described above, in accordance with the existing definition, an RSSI is calculated based on a measurement result on a specific OFDM symbol including a CRS. However, if such existing definition is directly applied to a discovery signal, the following problems may occur. It is assumed that a neighbor small cell sends a discovery signal in the OFF state. In this case, since no data is sent on a downlink subframe, there are problems in that a measured RSSI is inaccurate and the calculation of RSRQ is inaccurate.

As a solution for the problems, the definition of an RSSI may be improved as follows.

In the first example (Option A) of the improved scheme, improvement may be performed so that RSSI measurement is performed on all the OFDM symbols.

In the second example (Option B) of the improved scheme, improvement may be performed so that RSSI measurement is performed on a symbol in which a discovery signal is not transmitted (i.e., a non-DS-transmitting symbol).

In the third example (Option C) of the improved scheme, improvement may be performed so that RSSI measurement is performed on a subframe in which a discovery signal is not transmitted (i.e., a non-DS-transmitting subframe).

The first example (Option A) is described below in detail. In order to accurately reflect interference indicated by an RSSI, the RSSI may be measured on all the OFDM symbols on a subframe in which a discovery signal is detected. This method may be effective when a measurement subframe pattern is applied. The reason for this is that the measurement subframe pattern is determined by taking into consideration an ABS.

The second example (Option B) is described below in detail. The reason why RSSI measurement is performed on a symbol in which a discovery signal is not transmitted (i.e., a non-DS-transmitting symbol) may be divided in various ways as follows. First, RSSI measurement may be performed using OFDM symbols in which a discovery signal is not transmitted (Option B-1). Next, RSSI measurement may be performed using OFDM symbols that cannot be used for discovery signal transmission (Option B-2). Finally, RSSI measurement may be performed using OFDM symbols that have been configured by an eNodeB or that have been previously defined (Option B-3).

Hereinafter, a DS-PSS/DS-SSS may be illustrated as being transmitted through a new OFDM symbol region not OFDM symbols #5, #6, but is assumed to be transmitted through the OFDM symbols #5, #6 for convenience of description.

The Option B-1 is described in more detail below. UE may perform RSSI measurement using OFDM symbols in which the discovery signal of a target cell or transmission point that performs RSSI measurement is not transmitted. For example, if the discovery signal of a specific cell or transmission point includes a DS-PSS/DS-SSS (i.e., the discovery signal is transmitted on the OFDM symbols #5, #6) or includes a DS-CRS (i.e., the discovery signal is transmitted on OFDM symbols #0, #4, #7, #11), UE may perform RSSI measurement using OFDM symbols #1, #2, #3, #8, #9, #10, #12, #13 in which a discovery signal is not transmitted.

For another example, if the discovery signal of a specific cell or transmission point includes a DS-PSS/DS-SSS (i.e., the discovery signal is transmitted on the OFDM symbols #5, #6) or includes a DS-CSI-RS (i.e., the discovery signal is transmitted on OFDM symbols #9, #10), UE may perform RSSI measurement on OFDM symbols #0, #1, #2, #3, #4, #7, #8, #11, #12, #13 in which the discovery signal is not transmitted.

Furthermore, if a discovery signal includes a DS-PSS/DS-SSS/DS-CRS/DS-CSI-RS, UE performs RSSI measurement on an OFDM symbol region in which RSs are not transmitted by a cell or transmission point that performs measurement. Alternatively, UE may perform RSSI measurement on an OFDM symbol region in which a DS-CSI-RS is not transmitted by taking into consideration a sharing cell ID operation environment.

In such a scheme, UE may perform RSSI measurement on OFDM symbols in which an RS (DS-CRS and/or DS-CSI-RS) for performing measurement in the discovery signal of a target cell or transmission point performing RSSI measurement is not transmitted.

The Option B-2 is described in more detail below. First, if a discovery signal includes a DS-PSS/DS-SSS/DS-CR, UE may perform RSSI measurement on the remaining symbol region other than candidate OFDM symbol regions in which a DS-PSS/DS-SSS/DS-CRS may be transmitted. In such a scheme, UE may perform RSSI measurement on the remaining symbol region except candidate OFDM symbols in which an RS (DS-CRS and/or DS-CSI-RS) for performing measurement may be transmitted. That is, in this case, a symbol region that belongs to the regions of OFDM symbol for RSSI measurement to be described in the following examples and in which an RS used in measurement is not transmitted is excluded. An OFDM symbol region in which only a DS-PSS, DS-SSS is transmitted also excludes an OFDM symbol region in which a DS-PSS, DS-SSS is transmitted from RSSI measurement. Accordingly, a description is given below based on FDD, for example. An OFDM symbol region in which a DS-CRS is transmitted may correspond to OFDM symbols #0, #4, #7, #11 in a specific cell and may correspond to OFDM symbols #0, #1, #4, #5, #7, #8, #11, #12 in another cell. In this case, UE may perform RSSI measurement on the remaining OFDM symbol region other than the OFDM symbols #0, #1, #4, #5, #6, #7, #8, #11, #12. An OFDM symbol region for such RSSI measurement may be different depending on the number of antenna ports in which a DS-CRS is transmitted. The DS-CRS is transmitted on the OFDM symbols #0, #4, #7, #11 through antenna ports 0, 1, but is transmitted on the OFDM symbols #0, #1, #4, #5, #7, #8, #11, #12 through antenna ports 2, 3. Accordingly, an OFDM symbol region in which RSSI measurement is performed may be different depending on the number of antenna ports that may be included in a DS-CRS. That is, if the number of antenna ports that may be included in a DS-CRS is 1 and/or 2, UE may perform RSSI measurement on the remaining OFDM symbol region other than the OFDM symbols #0, #4, #5, #6, #7, #11. If the number of antenna ports that may be included in a DS-CRS is 1~4, UE may perform RSSI measurement on the remaining OFDM symbol region other than the OFDM symbols #0, #1, #4, #5, #6, #7, #8, #11, #12. The number of antenna ports that may be included in a DS-CRS may be different according to each frequency. In this case, UE needs to perform RSSI measurement on another OFDM symbol region using the number of antenna ports of a DS-CRS that has been configured for each frequency.

If a discovery signal includes a DS-PSS/DS-SSS/DS-CSI-RS, UE may perform RSSI measurement on the remaining symbol region other than candidate OFDM symbol regions in which the DS-PSS/DS-SSS/DS-CSI-RS may be transmitted. For example, a description is given below based on FDD. Assuming that a DS-CSI-RS may have all CSI-RS RE configurations, the DS-CSI-RS may be transmitted on OFDM symbols #5, #6, #9, #10, #12, #13. In this case, UE may perform RSSI measurement on the remaining OFDM symbol region other than the OFDM symbols #5, #6, #9, #10, #12, #13. In particular, assuming that data is muted on an RE region in which the DS-CSI-RS of another cell or transmission point may be transmitted through a ZP (zero-power) CSI-RS configuration, UE may perform RSSI measurement on an OFDM symbol region that has not been configured as the ZP CSI-RS. Since an OFDM symbol region in which a DS-CSI-RS may be transmitted is different in FDD and TDD, an OFDM symbol region in which UE performs RSSI measurement may be different depending on the FDD/TDD type of a frequency in which the UE performs measurement.

If a discovery signal includes a DS-PSS/DS-SSS/DS-CRS/DS-CSI-RS, UE performs RSSI measurement on an OFDM symbol region in which each RS may not be transmitted (in a frequency in which measurement is performed). Alternatively, UE may perform RSSI measurement on an OFDM symbol region in which a DS-CSI-RS cannot be transmitted by taking into consideration the sharing cell ID operation environment. If the Option B-2 is used, all the discovery signals that may be included in neighbor cells can be prevented from influencing RSSI measurement.

In the Option B-3, UE performs RSSI measurement on an OFDM symbol region that has been previously defined or an OFDM symbol region configured by an eNodeB. If an OFDM symbol region for RSSI measurement has been configured by an eNodeB, the OFDM symbol region for such RSSI measurement may be configured for each frequency.

In this case, if UE performs RSSI measurement on a previously defined OFDM symbol region, an OFDM symbol region for RSSI measurement may be determined as OFDM symbols #0, #1, #2, #3 within a first slot. Such a region can prevent an RSSI value from almost becoming a 0 (zero) value because it is a location that excludes locations, such as the location of a DS-PSS, DS-SSS, and DS-CSI-RS, and that includes some of a DS-CRS. Furthermore, if a DS-CRS is not included in a discovery signal, a CRS transmitted in the ON state may be included in RSSI measurement so that a more accurate RSSI value is measured. Alternatively, an OFDM symbol region for RSSI measurement may be determined as the OFDM symbols #1, #2, #3 of a first slot. Such a region is a location other than locations, such as a DS-PSS, a DS-SSS, a DS-CSI-RS, and a DS-CRS.

If the sharing cell ID operation environment is assumed, a PCID may be detected using a DS-PSS/DS-SSS (/DS-CRS), and the ID (transmission point ID) of a transmission port may be detected as a DS-CSI-RS. In this case, the transmission point ID may mean the RE configuration index or scrambling index (or an index configured through an RE configuration index and scrambling index) of the DS-CSI-RS. In this case, RSRP/RSRQ measurement for the cell (or cluster) of a specific PCID may be performed using a DS-CRS, and the RSRP/RSRQ measurement of each transmission point (i.e., each transmission point within a cluster) using the same PCID may be performed using the DS-CSI-RS. In this case, an OFDM symbol region in which the RSSI measurement of a cell (cluster) for a specific PCID is performed using the DS-CRS may be different from an OFDM symbol region in which the RSSI measurement of a transmission point using the DS-CSI-RS. For example, assuming that the OFDM symbol region in which the RSSI measurement of a cell (or cluster) for a specific PCID is performed using the DS-CRS includes part of the entire OFDM symbol region, if RSSI measurement is performed on a transmission point using the DS-CSI-RS, an OFDM symbol region in which the DS-CRS is transmitted may be excluded from a symbol region for measurement. For example, when the RSRP/RSRQ of a cell (or cluster) is measured using a DS-CRS, an OFDM symbol region in which RSSI measurement is performed may be identical with the OFDM symbols #0, #1, #2, #3 of a first slot. However, if the RSRP/RSRQ of a transmission point is measured using a DS-CSI-RS, an OFDM symbol region in which RSSI measurement is performed may be identical with the OFDM symbols #1, #2, #3 of a first slot other than an OFDM symbol region in which a DS-CRS is transmitted.

The third example (Option C) (i.e., RSSI measurement on a subframe in which a discovery signal is not transmitted) is described in detail below. In the second example (Option B), UE measures the RSSI of an OFDM symbol (i.e., a non-DS-transmitted OFDM symbol) in which a discovery signal is not transmitted. In this case, however, if the number of OFDM symbols occupied by a discovery signal is great, the number of OFDM symbols in which RSSI measurement may be performed may not be sufficient. In order to solve such a problem, in the third example (Option C), UE may perform RSSI measurement on a subframe in which a discovery signal is not transmitted. In this case, an eNodeB may notify the UE of the location of a subframe in which RSSI measurement will be performed. However, in order to reduce signaling overhead or with consideration taken of that a configuration is not required, UE may be made to implicitly know the location of a subframe in which RSSI measurement is to be performed. UE may receive a DMTC from an eNodeB. Such a DMTC may include a cycle and offset value and may also include a duration value. Accordingly, in this case, there is proposed that RSSI measurement be performed in a subframe next to a subframe in which PCID (transmission point ID) of a cell or transmission point on which UE will perform measurement. Alternatively, if a cycle and offset value are included in a DMTC, UE may perform RSSI measurement on a subframe (i.e., (n−1)-th subframe) that is one prior to the location of a subframe (i.e., an n-th subframe) indicated by a corresponding configuration or a next subframe (i.e., an (n+1)-th subframe). Alternatively, UE may perform RSSI measurement on a subframe including a subframe (i.e., (n−1)-th subframe) that is one prior to the location of a subframe (i.e., an n-th subframe) indicated by a corresponding configuration or a next subframe (i.e., an (n+1)-th subframe). Alternatively, UE may perform RSSI measurement on a subframe other than the location of a subframe indicated by a corresponding configuration. Such options may be useful in the case where a cell or transmission points sends discovery signals in the same subframe and the discovery signal includes a single subframe.

As described above, a DMTC may include a cycle and an offset value and may additionally include a duration value. In this case, when UE receives a DMTC from an eNodeB, the UE may perform RSSI measurement on a subframe other than the received timing duration. In this case, the UE may perform RSSI measurement on a next subframe after the timing duration indicated within a configuration is ended.

In another method of performing, by UE, RSSI measurement in a subframe in which a discovery signal is not transmitted, the UE may perform RSSI measurement on a subframe during for specific duration. In this case, an actual discovery signal may be received only on some subframes of the corresponding duration. For example, in such a measurement method, UE may perform RSSI measurement on each subframe for specific duration by taking into consideration the location of a subframe in which a discovery signal is actually transmitted, may average RSSI values, and may report a result of the RSSI measurement. In this case, the value of the corresponding duration may be included in a DMTC. Alternatively, the value of the corresponding duration may be a duration value for RSSI measurement that has been configured by an eNodeB separately from a duration value at which a discovery signal is expected to be transmitted. Alternatively, a separate timing configuration (e.g., a cycle, an offset and/or duration) for RSSI measurement may be configured for UE, and the UE may perform RSSI measurement on subframes during the corresponding duration, may average RSSI values measured for the corresponding duration, and may report a result of the average.

An eNodeB may configure that RSSI measurement has to be performed using which one of the Option A scheme and the Option B scheme for UE. Specifically, such a configuration may be performed for each frequency. That is, if UE has performed RSSI measurement using a discovery signal, an eNodeB may configure, for UE, that the UE has to perform RSSI measurement on an OFDM symbol region before a subframe in which a discovery signal is received (as described above in the Option A) or perform RSSI measurement on a (or some) OFDM symbol region in which a discovery signal is not received unable to be received (as described above in the Option B).

If a high layer has instructed that RSSI measurement be performed on all OFDM symbols, UE may perform RSSI measurement on all the symbols within a subframe for measurement. In this case, an eNodeB may configure that discovery signal-based RSSI measurement must be performed using the Option B scheme for UE (for a specific frequency) and also configure that RSSI measurement must be performed on all OFDM symbols for the UE. In this case, the UE may perform RSSI measurement on a cell or transmission point on which discovery signal-based measurement needs to be performed through the Option B scheme and perform RSSI measurement on all OFDM symbols on a cell or transmission point on which measurement needs to be performed according to an existing scheme through a high layer signal. This may be generalized as follows. UE may perform measurement on a cell or transmission point on which measurement is performed using an existing scheme using the existing scheme and perform measurement on a cell or transmission point on which discovery signal-based measurement is performed using a configuration related to a discovery signal.

Alternatively, UE may neglect high layer signaling instructing that RSSI measurement be performed on all OFDM symbols and perform measurement through the Option B scheme. This may be generalized as follows. UE may comply with a discovery signal configuration for all cells or transmission points, assuming that a discovery signal-related configuration is the top priority with respect to a cell or transmission point on which measurement is performed using an existing scheme and a cell or transmission point on which discovery signal-based measurement is performed.

If a high layer instructs that RSSI measurement be performed on all OFDM symbols, the instruction of such a high layer may also be applied to RSSI measurement using a discovery signal.

In this case, such a high layer signal may have priority when UE configures an OFDM symbol region for RSSI measurement. Specifically, UE basically assumes RSSI measurement on a (or some) OFDM symbol region in which a discovery signal is not received or cannot be received (as described above in the Option B). If a high layer signal instructing that RSSI measurement be performed using the entire OFDM symbol region is received from an eNodeB, the UE may perform RSSI measurement using the entire OFDM symbol region in a subframe in which a discovery signal is transmitted (as described above in the Option AP).

Alternatively, in order to prevent an RSSI from being over estimated due to the discovery signal of a cell in the OFF state, UE may neglect a higher layer signal although the higher layer signal instructing that RSSI measurement be performed on all OFDM symbol. For example, UE may perform RSSI measurement in a (or some) OFDM symbol region in which a discovery signal is not received or cannot be received (as in the Option B), may neglect a high layer signal instructing that RSSI measurement be performed in the entire OFDM symbol region although the UE receives the high layer signal from an eNodeB (as in the Option B), and may perform RSSI measurement in a (or some) OFDM symbol region in which a discovery signal is not received or cannot be received (as in the Option B).

If UE receives a measurement subframe pattern instructing that measurement be performed on a restricted subframe from an eNodeB, the UE performs RSSI measurement on all OFDM symbols within the restricted subframe.

In this case, specifically, the UE basically assumes that RSSI measurement will be performed in an (or some) OFDM symbol region in which a discovery signal is not received or cannot be received (as in the Option B). If the UE receives a measurement subframe pattern from an eNodeB, the UE may perform RSSI measurement in the entire OFDM symbol region within a subframe that belongs to restricted subframes and in which the discovery signal is received.

Alternatively, in order to prevent an RSSI from being over estimated due to the discovery signal of a cell in the OFF state, if UE receives a measurement subframe pattern from an eNodeB, it may perform RSSI measurement in a (or some) OFDM symbol region in which a discovery signal is not received or cannot be received in a restricted subframe (as in the Option B).

Alternatively, in order to prevent an RSSI from being over estimated due to the discovery signal of a cell in the OFF state, if UE receives a measurement subframe pattern from an eNodeB, it may neglect the configuration of the measurement subframe pattern.

If a discovery signal includes a PSS/SSS/CRS/CSI-RS (specifically, if a discovery signal includes a DS-CSI-RS), UE may perform RSSI measurement in a (or some) OFDM symbol region in which a discovery signal is not received or cannot be received although it receives an instruction that RSSI measurement be performed in the entire OFDM symbol region (as in the Option B). In contrast, if a discovery signal includes a PSS/SSS/CRS (i.e., if a discovery signal does not include a DS-CSI-RS), if UE receives an instruction that RSSI measurement be performed in the entire OFDM symbol region, it may perform RSSI measurement on all OFDM symbols in response to the instruction. If the corresponding instruction is not received, the UE may perform RSSI measurement only on OFDM symbols in which a CRS (or DS-CRS) is received as in the existing RSSI measurement. If a DS-CSI-RS has been configured, UE may comply with a new RSSI measurement method. If a DS-CSI-RS has not been configured, the UE performs RSSI measurement according to the existing scheme.

Specifically, if RSSI measurement is performed on OFDM symbols in which a DS-PSS/DS-SSS is received, RSSI measurement may not be performed in an OFDM symbol region or the entire symbol region in which a DS-PSS/DS-SSS is received in a bandwidth (e.g., the center 6 PRBs) region in which the DS-PSS/DS-SSS is received. Alternatively, specifically, when RSSI measurement is performed in a subframe in which a discovery signal is received, RSSI measurement may not be performed in a region other than center 6 PRBs. In this case, a discovery signal can be prevented from being deviated (i.e., a biased RSSI measurement result can be prevented from appearing) because the amount of resources occupied by a discovery signal within the center 6 PRBs is great. Alternatively, in this case, when RSSI measurement is performed only in a symbol region in which a discovery signal is not received, RSSI measurement may be performed if RSSI measurement symbol resources are not sufficient within the center 6 PRBs because an OFDM symbol region in which a discovery signal is received is sufficient.

IV. CSI/CQI Measurement

First, there may be several schemes for measuring RSSI as described above. As the RSSI measurement scheme is diversified as described above, a CQI may also be influenced. Accordingly, the following is proposed.

For CQI interference measurement, UE may not measure interference on an OFDM symbol including a discovery signal (or on an OFDM symbol including a discovery signal in a given subframe). For example, if a CRS is included in a discovery signal, the discovery signal may be received depending on a discovery signal timing configuration, but interference may not be measured on an OFDM symbol including the CRS.

For CQI interference measurement, if a discovery signal-based RSSI is measured on a subframe different from a subframe in which the discovery signal is received, when CQI interference is calculated, the subframe in which the discovery signal is received may need to be excluded. Accordingly, UE does not use a subframe in which DS is received with respect to interference measurement for CQI measurement. In other words, CQI interference measurement complies with RSSI definition.

For aperiodic CQI measurement, if a downlink subframe indicated by an aperiodic CSI request is a subframe in which a discovery signal is received according to the configuration of the discovery signal, UE does not consider the subframe to a valid downlink subframe. Alternatively, such a subframe may be excluded by network scheduling. Accordingly, if an aperiodic CSI request is present on a subframe, UE will still consider a subframe in which a discovery signal is received to be a valid subframe.

If a downlink subframe indicated by an aperiodic CSI request is included in a subframe indicated by a DMTC with respect to an aperiodic CQI request, the corresponding subframe may be considered to be not a valid downlink subframe. Alternatively, such a subframe may be excluded by network scheduling. Accordingly, if an aperiodic CSI request is present on a subframe, UE may still consider a subframe in which a discovery signal is received to be a valid subframe.

V. RSSI Measurement Subframe

If timing is not synchronized between small cells in a small cell environment, although the cells have the same discovery signal transmission timing, timing at which each cell actually sends a discovery signal may be different. This is described with reference to FIG. 20.

Figure 20:
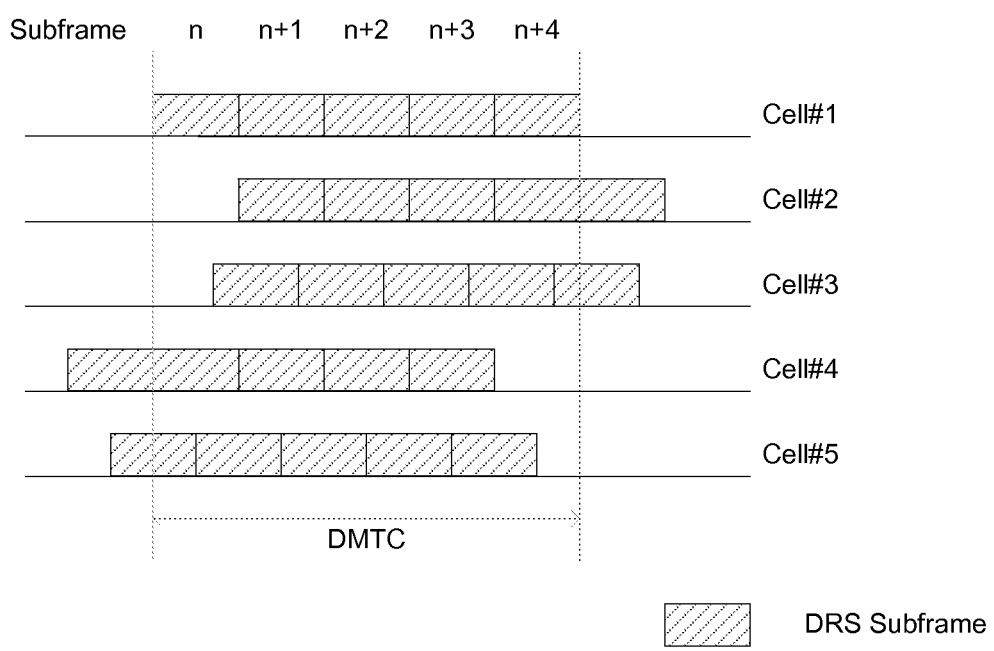
FIG. 20 illustrates another example in which transmission timing of discovery signals is different between cells.

FIG. 20 illustrates another example in which transmission timing of discovery signals is different between cells.

As may be seen with reference to FIG. 20, although all the discovery signals of a cell#1, a cell#2, . . . , a cell#5 are identically transmitted in subframes #n, #n+1, . . . , #n+4, if subframe timing is the same between the cells, timing at which each cell sends a discovery signal may be different.

In this state, assuming that the serving cell of specific UE is the cell#1, if the UE tries to perform discovery signal-based RSSI (or called DSSI) measurement, there may be a problem in that a measured DSSI value may be different depending on the configuration of the location of a subframe on which the measurement is performed because timing synchronization is not the same. Accordingly, methods of measuring a search DSSI in the following subframe duration in order to solve such a problem are hereinafter proposed.

In a first scheme, UE may check subframe duration in which neighbor cells sending discovery signals send the discovery signals in common according to a DMTC in order to measure DSSI and measure the DSSI using only the corresponding subframe duration. For example, as illustrated in FIG. 20, if UE is aware of the discovery signal transmission timing of the cell#1, that is, a serving cell, and the cell#2, the cell#3, the cell#4, and the cell#5, that is, neighbor cells, the UE may use only the subframes #n+1, #n+2, #n+3, that is, a subframe region in which the cell#1, . . . , the cell#5 send discovery signals in common for DSSI measurement. Furthermore, in the case of TDD, since such a problem is not present, such a configuration may be said to be limited to FDD. Furthermore, in order to align subframes in which discovery signal-based RSRP and RSSI are measured, it may be assumed that discovery signal-based RSRP measurement is performed in duration used in the measurement in DSSI.

In a second scheme, an eNodeB may configure the locations of subframes to be used for DSSI measurement for UE. For example, the location of a subframe for DSSI measurement may be included in a DMTC and configured. In order to represent the location of the subframe for DSSI measurement, the following values may be set.

An offset value from the start point of DMTC duration for indicating the start points of subframes for DSSI measurement The duration value of a subframe for DSSI measurement In this case, UE may use only "subframes for DSSI measurement" configured within DMTC duration for DSSI measurement. Furthermore, in order to align subframes in which discovery signal-based RSRP and RSSI are measured, it may be assumed that discovery signal-based RSRP measurement is performed only in duration used for DSSI measurement.

In a third scheme, in order to perform DSSI measurement, UE may use the entire DMTC duration for the DSSI measurement regardless of the location of a subframe in which a discovery signal is actually transmitted. For example, although the subframes #n~#n+4 are configured according to a DMTC and the discovery signal of a serving cell is transmitted only in the subframes #n~#n+2, UE may measure DSSI only in the subframes #n~#n+4, that is, DMTC duration. Furthermore, in order to align subframes in which discovery signal-based RSRP and RSSI are measured, it may be assumed that discovery signal-based RSRP measurement is performed only in duration used for DSSI measurement.

In a fourth scheme, UE assumes that a discovery signal is controlled by a network so that it is received in duration indicated by a DMTC. However, in this case, if cells are not synchronized, there may be a difference of a maximum of one subframe between the cells because a subframe boundary may be different. Accordingly, in this case, there may be a change of interference at the start point and end point of the DMTC (e.g., the discovery signals of only some cells may be transmitted). Accordingly, if a DMTC is received, UE may assume that DSSI measurement can be performed only in duration other than former/latter 1 msec. Such a configuration may be applied regardless of the synchronization of a network. Specifically, 1 msec before/after DMTC duration may be assumed to be not used for DSSI measurement. Furthermore, in the case of TDD, such a configuration may be said to be limited to only FDD because such a problem is not present. Furthermore, in order to align subframes in which discovery signal-based RSRP and RSSI are measured, discovery signal-based RSRP measurement may be assumed to be performed in subframe duration used in DSSI measurement according to the proposed method. That is, if DMTC duration is 5 msec, discovery signal-based RSRP/RSRQ measurement may be performed only in middle 3 msec.

The embodiments of the present invention described so far may be implemented through various means. For example, the embodiments of the present invention may be implemented by hardware, firmware, software, or a combination of them. This is described with reference to FIG. 21.

Figure 21:
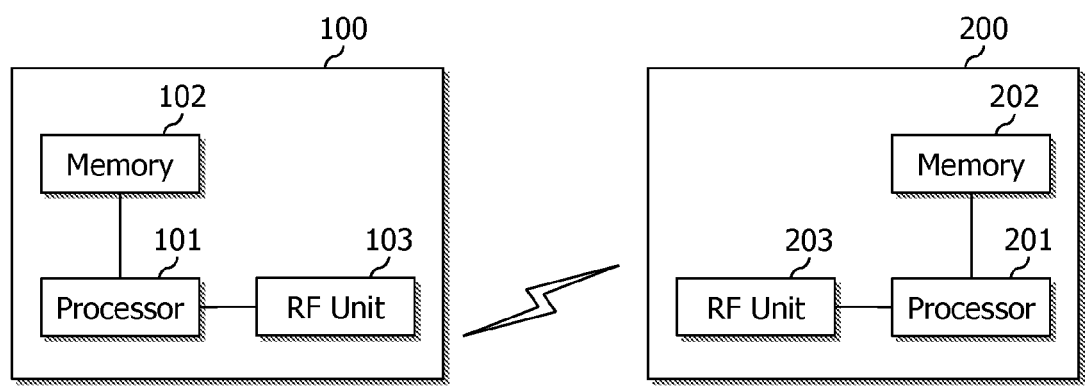
FIG. 21 is a block diagram illustrating a wireless communication system in which the disclosure of this specification is implemented.

FIG. 21 is a block diagram illustrating a wireless communication system according to an embodiment of the present invention.

A BS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

The UE 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for performing measurements, the method performed by a user equipment (UE) and comprising:
   receiving a measurement subframe pattern for a neighbor cell and a measurement timing configuration for a discovery signal;
   applying both of the measurement subframe pattern and the measurement timing configuration,
   wherein the measurement subframe pattern for the neighbor cell is not identical to the measurement timing configuration for the discovery signal;
   selecting at least one subframe to perform a measurement; and
   performing the measurement by using the discovery signal of the neighbor cell on the at least one selected subframe.

2. The method of claim 1, wherein the at least one selected subframe corresponds to at least one overlapped subframe between the measurement subframe pattern and the measurement timing configuration.

3. The method of claim 1, wherein the selecting step includes:
   selecting specific subframes based on the measurement subframe pattern; and
   selecting the at least one subframe among the specific subframes based on the measurement timing configuration.

4. The method of claim 1, wherein the measurement timing configuration is configured per carrier frequency.

5. The method of claim 1, further comprising:
   if the neighbor cell is in a deactivated state, using the discovery signal rather than a cell-specific reference signal (CRS) to perform the measurements.

6. The method of claim 1, wherein the discovery signal is a signal based on at least one of a cell-specific reference signal (CRS), a channel-state information reference signal (CSI-RS), a primary synchronization signal (PSS) and a secondary synchronization signal (SSS).

7. The method of claim 1, wherein if the measurement is for measuring a received signal strength indicator (RSSI), the measurement is performed on all orthogonal frequency division multiplexing (OFDM) symbols of a subframe.

8. A user equipment (UE) for performing measurements, comprising:
   a radio frequency (RF) unit configured to receive a measurement subframe pattern for a neighbor cell and a measurement timing configuration for a discovery signal;
   a processor configured to:
   apply both of the measurement subframe pattern and the measurement timing configuration,
   wherein the measurement subframe pattern for the neighbor cell is not identical to the measurement timing configuration for the discovery signal,
   select at least one subframe to perform a measurement, and
   perform the measurement by using the discovery signal of the neighbor cell on the at least one selected subframe.

9. The UE of claim 8, wherein the at least one selected subframe corresponds to at least one overlapped subframe between the measurement subframe pattern and the measurement timing configuration.

10. The UE of claim 8, wherein in order to select the at least one subframe, the processor is further configured to:
    select specific subframes based on the measurement subframe pattern; and
    select the at least one subframe among the specific subframes based on the measurement timing configuration.

11. The UE of claim 8, wherein the measurement timing configuration is configured per carrier frequency.

12. The UE of claim 8, wherein the processor is further configured to
    if the neighbor cell is in a deactivated state, use the discovery signal rather than a cell-specific reference signal (CRS) to perform the measurements.

13. The UE of claim 8, wherein
    the discovery signal is a signal based on at least one of a cell-specific reference signal (CRS), a channel-state information reference signal (CSI-RS), a primary synchronization signal (PSS) and a secondary synchronization signal (SSS).

14. The UE of claim 8, wherein if the measurement is for measuring a received signal strength indicator (RSSI), the measurement is performed on all orthogonal frequency division multiplexing (OFDM) symbols of a subframe.

* * * * *